US011383573B2

(12) United States Patent
Zink

(10) Patent No.: US 11,383,573 B2
(45) Date of Patent: Jul. 12, 2022

(54) STEERABLE INDEPENDENT WHEEL SUSPENSION WITH ADDITIONAL BRACKET

(71) Applicant: HORSCH LEEB Application Systems GmbH, Landau an der Isar (DE)

(72) Inventor: Florian Zink, Landau an der Isar (DE)

(73) Assignee: HORSCH LEEB Application Systems GmbH, Landau an der Isar (DE)

( * ) Notice: Subject to any disclaimer, the term of this patent is extended or adjusted under 35 U.S.C. 154(b) by 0 days.

(21) Appl. No.: 17/183,535

(22) Filed: Feb. 24, 2021

(65) Prior Publication Data

US 2021/0268861 A1 Sep. 2, 2021

(30) Foreign Application Priority Data

Feb. 28, 2020 (DE) .......................... 102020105378.9

(51) Int. Cl.
  *B60G 17/005* (2006.01)
  *B60G 17/08* (2006.01)
  *B60G 17/016* (2006.01)

(52) U.S. Cl.
  CPC .......... *B60G 17/08* (2013.01); *B60G 17/0162* (2013.01); *B60G 2202/15* (2013.01); *B60G 2202/242* (2013.01); *B60G 2300/083* (2013.01); *B60G 2400/252* (2013.01); *B60G 2500/202* (2013.01); *B60G 2500/30* (2013.01)

(58) Field of Classification Search
  CPC .... B60G 3/01; B60G 17/005; B60G 17/0525; B60G 11/27; B60G 2300/08; B60K 7/0007

See application file for complete search history.

(56) References Cited

U.S. PATENT DOCUMENTS

| 6,491,306 | B2 * | 12/2002 | Schaffer ................... B60G 3/01 |
| | | | 280/5.502 |
| 7,574,926 | B2 | 8/2009 | Anderson |
| 9,290,074 | B2 | 3/2016 | Slawson |
| 9,296,273 | B2 * | 3/2016 | Slawson ................ B60G 17/00 |
| 10,183,542 | B1 * | 1/2019 | Bittner ............... B60G 17/0165 |
| 10,766,329 | B2 * | 9/2020 | Slawson ............. B60G 17/005 |
| 2006/0170176 | A1 * | 8/2006 | Wubben ................ B60B 35/001 |
| | | | 280/124.127 |
| 2012/0241230 | A1 | 9/2012 | Vidal et al. |

(Continued)

FOREIGN PATENT DOCUMENTS

| EP | 2965928 B1 | 7/2017 |
| WO | 2017040847 A1 | 3/2017 |

*Primary Examiner* — Toan C To

(74) *Attorney, Agent, or Firm* — Avek IP, LLC; Kent R. Erickson

(57) ABSTRACT

The invention relates inter alia to a steerable independent wheel suspension for a mobile agricultural machine. A support device serves for the pivotable mounting of the independent wheel suspension on a frame part of the agricultural machine. At least one guide column is mounted displaceably in the support device. A wheel hub is guided displaceably along the at least one guide column. A bracket is connected fixedly to the at least one guide column so as to move with the at least one guide column. The bracket can allow a flexible and improved arrangement of height adjustment means, damping means and spring-mounting means of the independent wheel suspension.

14 Claims, 12 Drawing Sheets

(56) References Cited

U.S. PATENT DOCUMENTS

| | | | |
|---|---|---|---|
| 2013/0069336 A1* | 3/2013 | Horsch | B60G 3/01 |
| | | | 280/124.154 |
| 2015/0102568 A1 | 4/2015 | Slawson | |
| 2019/0176560 A1* | 6/2019 | Bittner | B60G 17/0165 |
| 2020/0130741 A1* | 4/2020 | Crowley | B62D 7/163 |

* cited by examiner 14, 16

STEERABLE INDEPENDENT WHEEL SUSPENSION WITH ADDITIONAL BRACKET

CROSS-REFERENCE TO RELATED APPLICATIONS

This application claims the benefit of German Patent Application No. DE 10 2020 105 378.9, filed Feb. 28, 2020, the disclosure of which is hereby incorporated herein in its entirety by reference.

BACKGROUND

The invention relates to a steerable independent wheel suspension for a mobile agricultural machine. The invention also relates to a mobile agricultural machine having a steerable independent wheel suspension.

EP 2 965 928 A1 discloses an independent wheel suspension for a steerable wheel of an agricultural tractor, transport or special vehicle. The independent wheel suspension includes a steering column which interacts via a fork bridge with a linear guide which is movable in an approximately vertical direction. The fork bridge is pivotable about an approximately vertically running axis of rotation. Furthermore, the linear guide is coupled to a fluidic damping element which forms a load-bearing constituent part of the fork bridge. The damping element includes a damping cylinder which is formed as a steering column. Furthermore, the damping element has one or more pressure reservoirs with connections, wherein the pressure reservoirs are fluidically connected via line systems to the damping cylinder.

U.S. Pat. No. 7,574,926 B2 discloses an arrangement for detecting the shaft angle for a steerable independent wheel suspension.

SUMMARY

The invention is based on the object of creating an alternative and/or improved independent wheel suspension. The object is achieved by means of the features of the independent claim. Advantageous refinements are specified in the dependent claims and in the description.

One aspect of the present disclosure relates to a steerable independent wheel suspension for a mobile agricultural machine. The independent wheel suspension has a steering column (for example for fastening to a frame part or to a track widening device of the agricultural machine). The independent wheel suspension has a preferably frame-like support device which, for the steering of the independent wheel suspension, is connected pivotably to the steering column. The support device has a first cross-bracket and a second cross-bracket which are vertically spaced apart from one another. The first cross-bracket and the second cross-bracket are mounted rotatably on the steering column (for example by means of an inner bolt which is fastened to the first cross-bracket and to the second cross-bracket and which is rotatable relative to the steering column). The independent wheel suspension has at least one guide column which is mounted, preferably fixedly or displaceably, on the support device. The independent wheel suspension has a wheel hub which (for example by means of a guide carriage) is guided displaceably along the at least one guide column.

The multiple mounting of the steering column on the two cross-brackets preferably offers a double-shear pivot connection. By means of this double-shear pivot connection, the durability of the independent wheel device can be significantly improved. The support device can be optimized with regard to strength. The precision of the pivotable mounting can be improved. Wear phenomena can thus be delayed. The guided mounting of the wheel hub on the at least one guide column furthermore allows the implementation of a height adjustment function, spring-mounting function and/or damping function.

The steering column may preferably be essentially arranged, preferably centrally, between the first cross-bracket and the second cross-bracket.

The steering column may expediently be in an upright orientation, for example so as to be vertical or inclined with respect to the vertical.

In one exemplary embodiment, the support device has at least one connecting bracket which connects the first cross-bracket and the second cross-bracket to one another, preferably in rotationally rigid or rotationally fixed fashion, and/or by means of which the at least one guide column is mounted, preferably in a receptacle (for example blind hole or passage hole) of the at least one connecting bracket.

In a further exemplary embodiment, the at least one guide column is arranged, in certain sections, level with the first cross-bracket and, in certain sections, level with the second cross-bracket. In this way, in turn, it is possible to attain an improved, in particular more uniform, transmission of force into the support device and the frame construction.

In a further exemplary embodiment, the support device forms a single-piece housing for the mounting of the steering column in the first cross-bracket and the second cross-bracket and for the mounting of the at least one guide column (for example in at least one connecting bracket of the support device). The single-piece housing can allow advantages in terms of assembly. The support device does not need to be assembled from individual parts. In this way, very small tolerances can be achieved. Dimensional accuracy of the support device can be more exactly adhered to. This can have a positive effect on all functions associated with the support device. For example, in this way, it is also possible for sliding characteristics, guidance characteristics, damping characteristics or spring-mounting characteristics to be improved.

In one embodiment, the support device is formed integrally in one piece, preferably as a cast, forged, welded and/or fibre composite construction. Alternatively or in addition, the first cross-bracket and the second cross-bracket are formed integrally in one piece with one another, preferably as a cast, forged, welded and/or fibre composite construction. It is also possible for the first cross-bracket and the second cross-bracket to be connected to one another in rotationally rigid, play-free and/or immovable fashion.

In a further embodiment, the independent wheel suspension furthermore has a steering arm for the attachment of a steering cylinder, wherein the steering arm is preferably fastened to the steering column between the first cross-bracket and the second cross-bracket. This can be particularly expedient in terms of structural space.

In a further embodiment, the support device has a steering cylinder flange section (for the attachment of a steering cylinder) which is preferably arranged, particularly preferably in the form of a projection, on a connecting bracket, which connects the first cross-bracket to the second cross-bracket, of the support device.

The independent wheel suspension may preferably have a steering cylinder which is attached at one side to one end of the steering arm and at the other side to the steering cylinder flange section.

In one design variant, the at least one guide column is in a skewed orientation with respect to the steering column, wherein, preferably, the at least one guide column is inclined relative to the vertical to a greater degree than the steering column (for example is inclined such that the wheel hub is further to the outside, in relation to a transverse axis of the agricultural machine, than the support device). It is thus possible for a spacing between the guide column and the wheel hub at the level of the wheel hub to be reduced. The smaller the spacing between the wheel hub and the guide column, the smaller a lever action can be, and the smaller forces acting on the support device can be, and the greater the moment compensation can be. Alternatively, the at least one guide column may be oriented parallel to the steering column.

The expression "skewed" can preferably describe a geometrical spatial relative relationship between two bodies, the main axes/longitudinal axes of which do not intersect and are also not arranged parallel to one another.

In a further design variant, the first cross-bracket and/or the second cross-bracket is mounted on the steering column by means of a cone system, preferably a double cone system. Such a cone system can serve on the one hand for play-free and maintenance-free mounting. On the other hand, it is suitable for compensating manufacturing tolerances. Furthermore, by means of the cone system, torsion of the support device in the region of the mounting on the steering column can be prevented.

In a further design variant, the independent wheel suspension has an inner bolt which is mounted preferably rotatably in the steering column and/or is preferably mounted fixedly on the first cross-bracket and the second cross-bracket.

For example, the inner bolt may be mounted slidingly on the steering column or, by means of a separate mounting, rotatably with respect to the steering column.

In one refinement, the independent wheel suspension has at least one clamping bushing which fastens, preferably clamps, one end of the inner bolt in a hole, preferably passage hole, of the first cross-bracket or of the second cross-bracket.

One exemplary embodiment includes a first clamping bushing and a second clamping bushing. Preferably, the first clamping bushing fastens a first end of the inner bolt in a hole of the first cross-bracket, and/or the second clamping bushing fastens a second end of the inner bolt in a hole of the second cross-bracket.

In a further exemplary embodiment, the at least one clamping bushing has an internal cone, and the end of the inner bolt has an external cone, and/or the at least one clamping bushing has an external cone and the hole has an internal cone.

In one refinement, the independent wheel suspension has at least one clamping device, preferably having a clamping plate and at least one clamping screw, wherein the at least one clamping device is preferably supported on the at least one clamping bushing and/or screwed into the end of the inner bolt, preferably for the purposes of clamping the inner bolt.

In one embodiment, the independent wheel suspension has at least one damper device which connects the wheel hub in damped fashion to the support device. Preferably, the at least one damper device may be fastened to an outer side, which faces in a direction of travel (for example forward direction of travel or reverse direction of travel), of the support device, preferably of a connecting bracket of the support device.

In a further embodiment, the independent wheel suspension has at least one height adjustment device which connects the wheel hub in height-adjustable fashion to the support device, wherein the at least one height adjustment device is preferably fastened to an outer side, which faces in a direction of travel (for example forward direction of travel or reverse direction of travel), of the support device, preferably of a connecting bracket of the support device.

In a further embodiment, the independent wheel suspension has a spring device, preferably a spring bellows, which connects the wheel hub with spring action to the support device. Preferably, the spring device may be fastened, preferably centrally, to a bottom side of the support device.

In one design variant, the first cross-bracket and/or the second cross-bracket has two substantially parallel chords or ties which are connected to one another only in certain sections, preferably only at the ends of the chords and in the region of a mounting of the steering column.

In a further design variant, the second cross-bracket is arranged further to the outside in relation to a transverse axis of the agricultural machine than the first cross-bracket. In this way, a steering axis which is inclined in relation to the vertical can be made possible in a simple and durable manner.

Preferably, the support device may be reinforced in certain regions by means of a reinforcement insert, preferably in the region of the mounting of the steering column and/or of the mounting of the at least one guide column.

Preferably, the support device may be supplemented in certain regions by means of a functional insert, preferably in the region of the mounting of the steering column and/or of the mounting of the at least one guide column.

It is possible for the at least one guide column to have a first guide column and a second guide column, which are preferably of symmetrical design in relation to one another with respect to the steering column. An asymmetrical arrangement of the guide columns with respect to the steering column is likewise possible.

The at least one guide column and/or the steering column may preferably be oriented upright but so as to be inclined with respect to the vertical.

A further aspect of the present disclosure likewise relates to a steerable independent wheel suspension for a mobile agricultural machine. The independent wheel suspension has a support device for the pivotable mounting of the independent wheel suspension about a steering axis on a frame part of the agricultural machine. The independent wheel suspension has at least one guide column which is mounted, preferably fixedly or displaceably, on the support device. The independent wheel suspension has a wheel hub which is guided displaceably along the at least one guide column. The independent wheel suspension has a spring device, preferably a spring bellows (for example air spring bellows), which connects the wheel hub with spring action (for example directly or indirectly) to the support device, wherein a central longitudinal axis of the spring device is not coaxial with respect to the steering axis.

The independent wheel suspension may have an improved arrangement of the spring device. The non-coaxial arrangement may serve for achieving an improved introduction of force of the wheel hub into the support device and into the steering column. In particular, the arrangement of the spring device may serve for moment compensation of the forces introduced by the wheel hub into the independent wheel suspension.

In one exemplary embodiment, the central longitudinal axis is oriented parallel or at an angle with respect to the steering axis. For example, the central longitudinal axis and the steering axis may intersect and enclose an angle. It is also possible for the central longitudinal axis and the steering axis to not intersect, and to thus be parallel or skewed with respect to one another.

In a further exemplary embodiment a (for example horizontal) spacing between the steering axis and the central longitudinal axis is greater than 0 cm, 2 cm, 4 cm or 10 cm. Alternatively or in addition, it is for example possible for a (for example horizontal) spacing between a central point of the spring device and the steering axis to be greater than 0 cm, 2 cm, 4 cm or 10 cm. The spacing may for example be selected in accordance with desired moment compensation in accordance with the respective configuration of the independent wheel suspension.

In a further exemplary embodiment, the spring device is arranged so as to be offset outwards relative to the steering axis with respect to a lateral axis of the agricultural machine, preferably in order to reduce a spacing to a wheel supported by the wheel hub. This arrangement towards the wheel hub can allow the abovementioned moment compensation in a particularly effective manner.

In one embodiment, the spring device is oriented substantially upright, preferably vertically or so as to be inclined with respect to the vertical.

In a further embodiment, the spring device is arranged between two guide columns, and/or the spring device is arranged between the wheel hub and the support device. This yields an arrangement of the spring device which is both protected and expedient in terms of structural space.

In a further embodiment, a spring characteristic of the spring device has a progressive spring force profile. The force may increase with increasing spring travel. This may be expedient for example during cornering manoeuvres, because the superstructure then does not tilt laterally to such a great degree.

In a further embodiment, the spring device is designed as a twin corrugated bellows. A twin corrugated bellows may in particular have the advantage that, while having substantially the same spring action characteristics as a rolling corrugated bellows, for example, it has a much smaller structural height. The twin corrugated bellows can furthermore be less susceptible to faults and more resistant to dirt.

In one design variant, the steerable independent wheel suspension furthermore has a connecting element which fastens the spring device to the support device, wherein the connecting element has a first (for example upper) flange surface, which is oriented coaxially with respect to the steering axis, and/or has a second (for example lower) flange surface, which is oriented coaxially with respect to the central longitudinal axis. The offset arrangement of the spring device can thus be made possible without redesign of the spring device itself.

In one refinement, the first flange surface and the second flange surface are oriented parallel to one another, and/or the first flange surface and the second flange surface are arranged offset with respect to one another in a plan view, and/or the first flange surface and the second flange surface are connected to one another by at least one diagonal strut of the connecting element, and/or the connecting element is designed as a frame.

In a further design variant, the steerable independent wheel suspension furthermore has a steering column which has the steering axis and which is pivotably connected to the support device, wherein the spring device is arranged below the steering column. In this way, no structural space is required above the steering column for the arrangement of the spring device.

In a further design variant, the steerable independent wheel suspension has at least one damper device which connects the wheel hub with damping action (for example directly or indirectly) to the support device.

In a further design variant, the steerable independent wheel suspension has at least one height adjustment device which connects the wheel hub in height-adjustable fashion (for example directly or indirectly) to the support device.

In one refinement, the at least one damper device and/or the at least one height adjustment device is oriented substantially parallel to the steering axis and/or the central longitudinal axis.

In one exemplary embodiment, the at least one damper device has a pneumatic cylinder, a hydraulic cylinder, a gas pressure damper or a shock damper.

In a further exemplary embodiment, the at least one height adjustment device has a pneumatic cylinder, a hydraulic cylinder, a linear drive or a mechanical height locking device.

In a further exemplary embodiment, the at least one damper device and/or the at least one height adjustment device is arranged at the outside on a side, which faces in a direction of travel (for example forward direction of travel or reverse direction of travel), of the steerable independent wheel suspension.

In one embodiment, the spring device is designed for maintaining a constant height of the spring device (for example with a corresponding level valve).

In a further embodiment, the spring device is actuatable or correspondingly actuated (for example by a control unit designed for this purpose) for the height adjustment of the steerable independent wheel suspension.

A further aspect of the present disclosure likewise relates to a steerable independent wheel suspension for a mobile agricultural machine. The independent wheel suspension has a support device for the pivotable mounting of the independent wheel suspension on a frame part of the agricultural machine. The independent wheel suspension has at least one guide column which is mounted displaceably in the support device. The independent wheel suspension has a wheel hub which is guided displaceably along the at least one guide column. The independent wheel suspension has a bracket (for example cross-bracket and/or lift bridge) which is fixedly connected (for example in non-positively locking, positive locking and/or cohesive fashion) to the at least one guide column so as to move with the at least one guide column.

The additional bracket allows an improved and more flexible arrangement of further components of the independent wheel suspension. These components may for example be connected at one side to the support device and at the other side to the bracket. These components may for example also be connected at one side to the bracket and at the other side to the wheel hub. Since the bracket moves with the at least one guide column, the bracket can be moved relative to the support device, for example in order to allow a height adjustment function. On the other hand, the wheel hub can be moved relative to the bracket, because the wheel hub is guided on the at least one guide column. A damping and/or spring-mounting function, for example, can thus be made possible.

In one exemplary embodiment, the bracket is fastened to the at least one guide column. Alternatively, the bracket may for example be formed integrally and in one piece with the at least one guide column, preferably as a cast, forged or welded construction.

In a further exemplary embodiment, the bracket is arranged below the support device and/or above the wheel hub. This arrangement can be particularly expedient in terms of structural space.

In a further exemplary embodiment, the at least one guide column is clamped in a receptacle (for example passage hole) of the bracket, preferably at a slotted end of the bracket.

In one embodiment, the wheel hub is connected movably to the bracket, and/or the bracket is connected movably to the support device.

In a further embodiment, a spacing between the bracket and the wheel hub is variable, preferably for spring-mounting and/or damping of the wheel hub on the bracket.

In a further embodiment, a spacing between the bracket and the support device is variable, preferably for height adjustment of the steerable independent wheel suspension.

In one design variant, a relative movement between the bracket and the wheel hub is independent of a relative movement between the bracket and the support device, and/or a variable spacing between the bracket and the support device is independent of a variable spacing between the bracket and the support device. In this way, it can be made possible that, for example, a height adjustment as a variation of the spacing between the support device and the bracket has no effect on a spring-mounting and/or damping acting between the bracket and the wheel hub. The spring-mounting characteristics and/or the damping characteristics remain the same if a height of the independent wheel suspension is adjusted.

In a further design variant, the independent wheel suspension furthermore has a spring device, preferably a (for example air) spring bellows, which is fastened (for example directly) to the bracket.

In one refinement, the spring device is arranged between the bracket and the wheel hub or is arranged between the bracket and the support device.

In one exemplary embodiment, the spring device connects the wheel hub with spring action to the bracket, or connects the bracket with spring action to the support device.

In a further exemplary embodiment, the spring device is arranged substantially centrally with respect to a length of the bracket, and/or the spring device is arranged below or above the bracket.

In one embodiment, the independent wheel suspension furthermore has at least one damper device which is fastened (for example directly) to the bracket.

In one refinement, the at least one damper device is arranged substantially parallel to the at least one guide column.

In a further embodiment, the at least one damper device connects the wheel hub with damping action to the bracket or connects the bracket with damping action to the support device.

In a further embodiment, the at least one damper device has a pneumatic cylinder, a hydraulic cylinder, a gas pressure damper or a shock damper.

In a further embodiment, the at least one damper device is arranged at the outside on a side, which faces in a direction of travel (for example forward direction of travel or reverse direction of travel), of the steerable independent wheel suspension.

One design variant includes a single damper device, which is preferably fastened to one end of the bracket. Alternatively, it is for example possible for two damper devices to be included, which are preferably fastened to opposite ends of the bracket.

In a further design variant, the independent wheel suspension furthermore has at least one height adjustment device which is fastened (for example directly) to the bracket.

In one refinement, the at least one height adjustment device is arranged substantially parallel to the at least one guide column.

In one exemplary embodiment, the at least one height adjustment device connects the wheel hub in height-adjustable fashion to the bracket or connects the bracket in height-adjustable fashion to the support device.

In a further exemplary embodiment, the at least one height adjustment device has at least one linear drive, one pneumatic cylinder, one hydraulic cylinder and/or one mechanical height locking device.

In a further exemplary embodiment, the at least one height adjustment device is arranged at the outside on a side, which faces in a direction of travel (for example forward direction of travel or reverse direction of travel), of the steerable independent wheel suspension.

For example, the at least one height adjustment device may be fastened to one end of the bracket. If two height adjustment devices are included, these may preferably be fastened to opposite ends of the bracket.

In a further exemplary embodiment, the at least one height adjustment device and the at least one damper device are arranged on opposite sides with respect to the bracket, for example on a top side and a bottom side.

According to a further aspect, a mobile agricultural machine (for example field sprayer, fertilizer spreader, tractor vehicle or trailer) is disclosed, which has at least one steerable independent wheel suspension as disclosed herein.

The expression "control unit" used herein may preferably refer to a set of electronics (for example with microprocessor(s) and data memory) and/or mechanical, hydraulic or pneumatic controller, which can perform open-loop control tasks and/or closed-loop control tasks depending on its design. Also, where the expression "control" is used herein, this may likewise expediently also encompass "closed-loop control" or "control with feedback".

Generic agricultural distribution machines comprise a carrier vehicle, a distributor boom for spreading material, such as a fertilizer, plant protection agents, or seeds, which is indirectly or directly arranged on the carrier vehicle so as to be movable at least about a pivot axis running in the direction of travel and a control apparatus for controlling and/or regulating a rotational position of the distributor boom about the pivot axis.

In order to spread the material over a large surface area on the agricultural field to be cultivated, distributor booms of such field sprayers or pneumatic fertilizer spreaders have lateral cantilevered arms with a large working width, in some cases of more than twenty meters, on which spreading means are arranged, for example spray nozzles in field sprayers or deflector plates in pneumatic fertilizer spreaders. For transport journeys, such wide spraying booms are folded and collapsed.

For efficient spreading, in particular for a coverage of the ground with material which is as uniform as possible, the distance between the distributor boom and the agricultural field is designed to remain as uniform as possible over the entire working width. For this reason, in the case of increasing dimensions of the cantilevered arms and the working width associated therewith, there is the need to guide the spraying boom at a distance from the ground which is as uniform as possible, since even small oblique positions of the spraying boom will lead to significant differences in the distance of the spreading means along the distributor boom, for example the spray nozzles, from the ground. Inadvertent fluctuations of the distributor boom may also increase undesired drift of the material to be spread.

To this end, it is known to suspend a distributor boom on a carrier vehicle so as to be rotatable about a central point, at least about a rotational axis. The rotational axis in this case preferably runs parallel to the longitudinal axis and/or to the direction of travel of the carrier vehicle. In order to ensure a uniform spreading of the material, the distance between the upper edge of the plant population and the spreading means is continuously regulated to a defined distance.

In this case, a plurality of approaches are known from the prior art in order to hold the distributor boom as far as possible in the desired target rotational position, to detect deviations from the target rotational position and in the case of deviations of the distributor boom to return the distributor boom back to the target rotational position by means of a controlling apparatus.

DESCRIPTION OF THE DRAWINGS

The above-described preferred embodiments and features of the invention may be combined with one another in any desired manner, in particular also features which are associated with different aspects of the present disclosure. Further details and advantages of the invention will be described below with reference to the appended drawings, in which:

FIGS. 2-4a show various views of a first exemplary embodiment of a steerable independent wheel suspension according to the present disclosure, wherein FIG. 4A illustrates a detail from FIG. 4;

DETAILED DESCRIPTION

The embodiments shown in the figures at least partially correspond, such that similar or identical parts are denoted by the same reference designations and, for the explanation thereof, reference is also made to the description of the other embodiments and figures in order to avoid repetitions.

Figure 1:
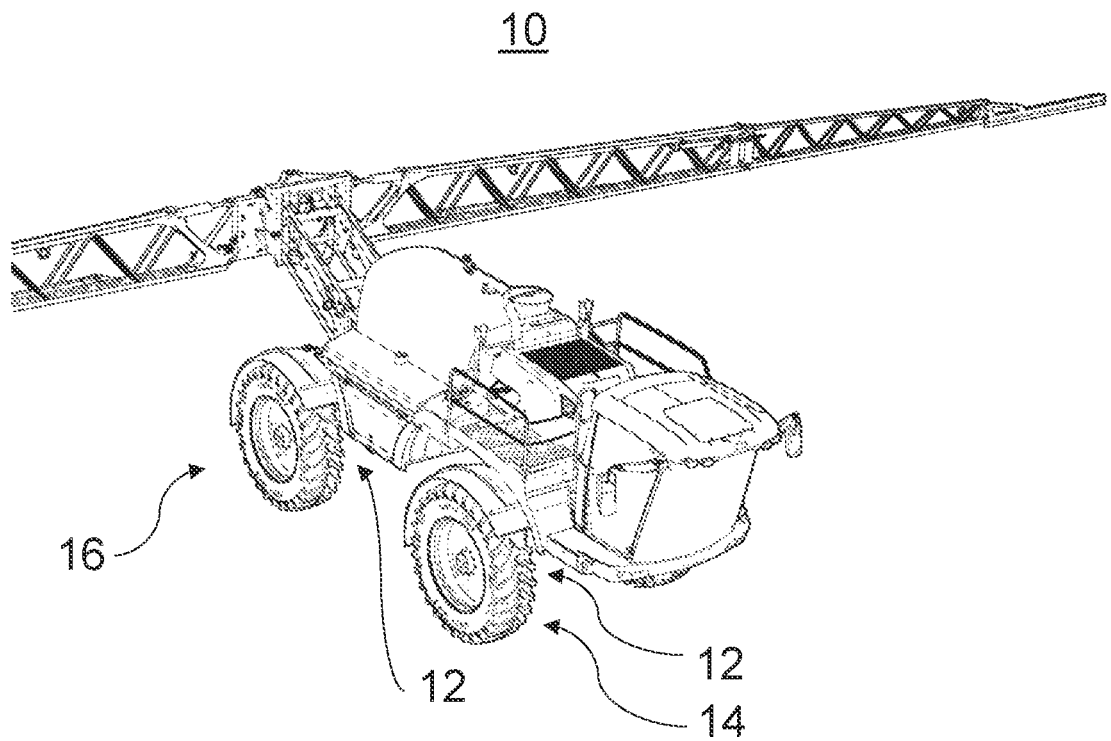
FIG. 1 shows a perspective view of a mobile agricultural machine.

FIG. 1 shows a mobile agricultural machine 10. The mobile agricultural machine 10 may be an agricultural utility vehicle, for example a so-called field sprayer, as illustrated in FIG. 1. The mobile agricultural machine 10 may however also be of some other design, for example designed as a fertilizer spreader, as a tractor vehicle or as a trailer. The mobile agricultural machine may be self-propelling or capable of being towed by means of a tractor vehicle. The mobile agricultural machine 10 may also be operable manually and/or in automated (for example partially automated or fully autonomous) fashion.

The agricultural machine 10 has multiple steerable independent wheel suspensions 12. In each case two independent wheel suspensions 12 may be arranged at a front axle 14 and/or a rear axle 16 of the agricultural machine 10. The agricultural machine 10 may also have more or fewer than two axles. The independent wheel suspensions 12 of at least one axle 14 or 16 are steerable relative to a frame of the agricultural machine 10.

The axles 14,16 may, depending on design, be adjustable in terms of track width or fixed in terms of track width. This means that it is possible for a track width of the agricultural machine 10 to be adjustable by displacement of the independent wheel suspensions 12 outwards transversely with respect to the direction of travel, for example for adaptation to driving lanes of different width and/or in order to be able to travel on public roads. On the other hand, a track width may be fixed. A spacing between the independent wheel suspensions 12 of the axle 14 and/or of the axle 16 may be invariant.

The independent wheel suspension 12 may, depending on design, be height-adjustable or non-height-adjustable. In the case of a height-adjustable independent wheel suspension 12, the relative height thereof with respect to the frame of the agricultural machine 10 can be adjusted. In this way, a ground clearance below the frame of the agricultural machine 10 can be varied, for example in accordance with topology of the terrain or plant growth. The height adjustment may be performed for example mechanically (for example by means of locking elements) and/or by means of linear drive (for example electromagnetically, electromotively, hydraulically, pneumatically). On the other hand, a height setting of the independent wheel suspensions 12 may be fixed.

If the independent wheel suspension 12 has a height adjustment, this may for example have a height adjustment range of 650 mm, 550 mm, 450 mm or less. If a hydraulic height adjustment is provided, this may preferably be implemented by means of volume flow control. In a manner dependent on a desired height of the independent wheel suspension 12, a predefined quantity of hydraulic fluid, for example oil, can be supplied to and/or discharged from the hydraulic cylinders.

A slope levelling facility may also be provided. By means of a sensor of the agricultural machine 10, it can be detected whether the agricultural machine 10 is in an oblique position, for example on a slope. The height-adjustable independent wheel suspensions 12 can be adjusted to different heights in order to level the agricultural machine 10, or orient the agricultural machine 10 horizontally, if possible. As a sensor, use may for example be made of an inclination sensor of the agricultural machine 10 or of a pressure sensor or travel sensor of a suspension arrangement and/or damping arrangement of the agricultural machine 10.

The independent wheel suspension 12 may, depending on design, be spring-mounted or non-spring-mounted, that is to say may or may not have a spring device. Alternatively or in addition, the independent wheel suspension 12 may, depending on design, be damped or non-damped, that is to say may or may not have a damping device.

Various exemplary embodiments of the independent wheel suspensions 12 will be described in detail below. It is pointed out that individual functions or features of the exemplary embodiments of the independent wheel suspensions 12A-12F may be exchangeable for or combinable with one another as long as no technical contradictions arise. In particular, the independent wheel suspension 12 may be adjustable in terms of track width or non-adjustable in terms of track width, height-adjustable or non-height-adjustable, spring-mounted or non-spring-mounted, and damped or non-damped.

Figure 2:
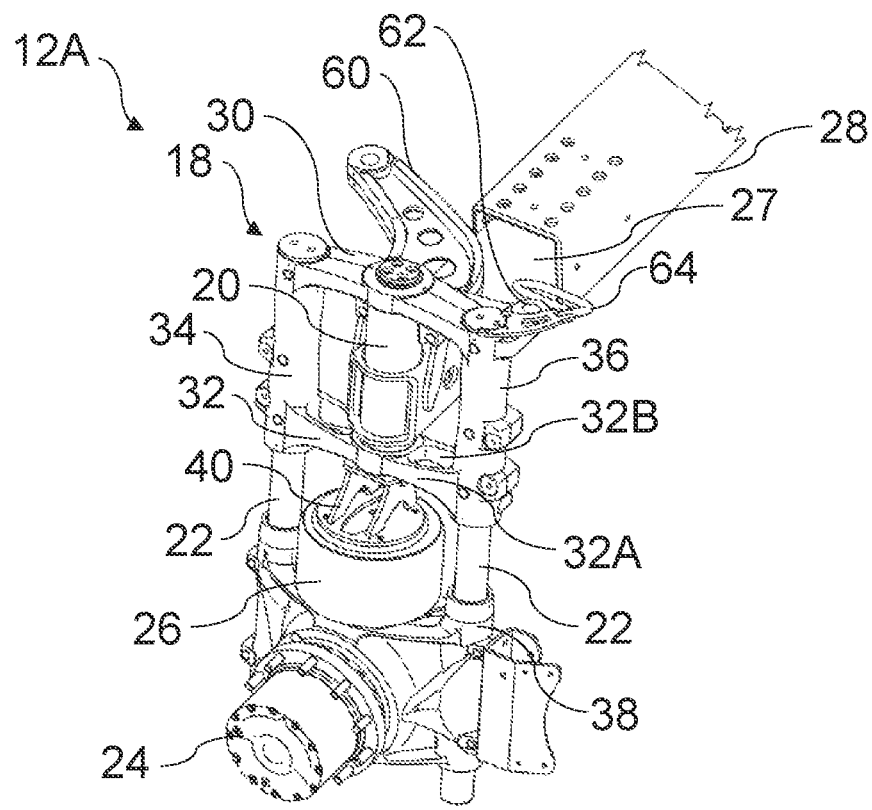
Figure 3:
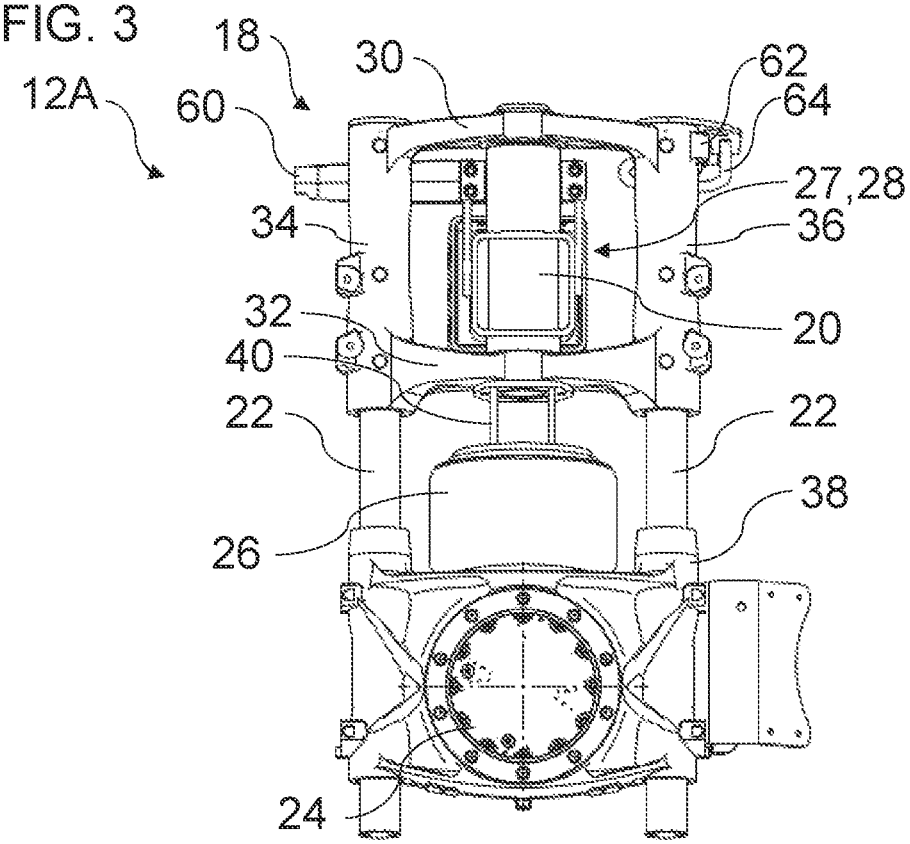
Figure 4:
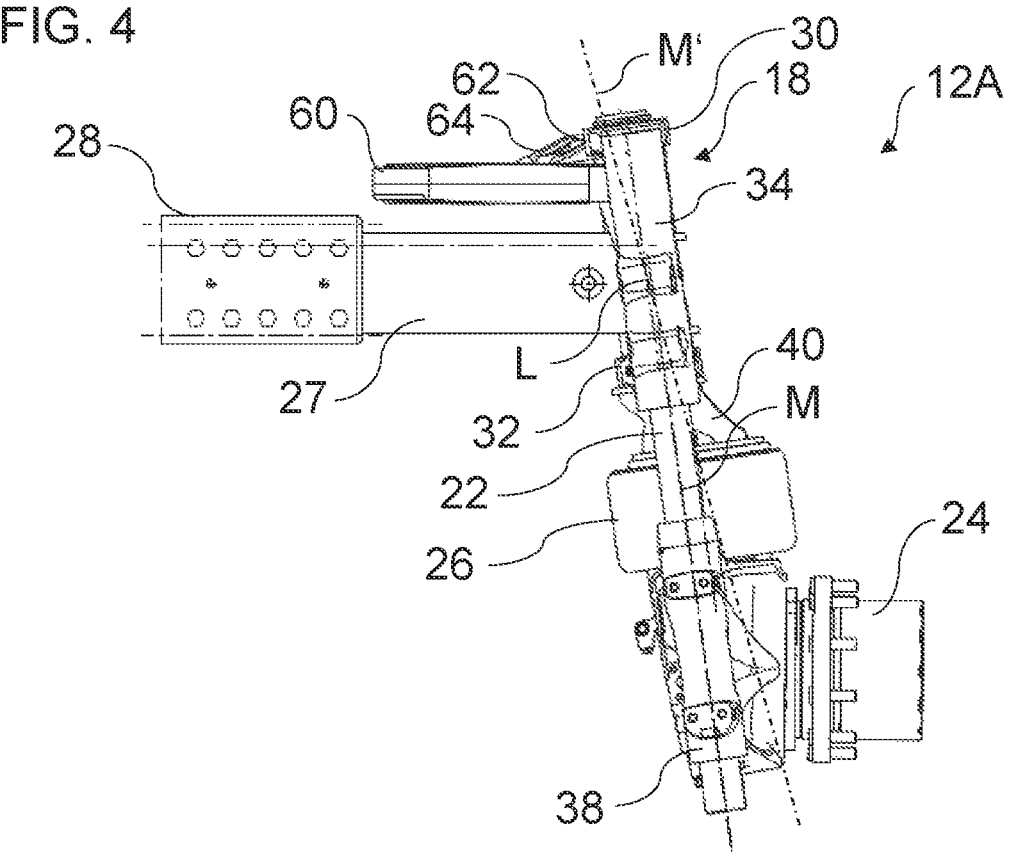

FIGS. 2 to 4 show a first exemplary embodiment for the independent wheel suspension, which is denoted by the reference designation 12A.

The independent wheel suspension 12A has a support device 18, two guide columns 22, a wheel hub 24 and a spring device 26. The support device 18 may also be referred to as a fork bridge for the two guide columns 22. The independent wheel suspension 12A is connected pivotably to a steering column 20.

The support device 18 is connected pivotably to the steering column 20. The steering column 20 is attached by means of a displacement part 27 to a frame part 28 of the agricultural machine 10. The steering column 20 and the displacement part 27 may for example be welded or screwed to one another. The attachment to the frame part 28 may, for the variation of a track width of the agricultural machine 10, be displaceable in a transverse direction of the agricultural machine 10, as illustrated in FIGS. 2 to 4. It is however also possible for a fixed attachment to the frame part 28 to be included. Fixtures of the agricultural machine 10, such as for example a driver's cab, a tank, a tool etc., can be supported on the frame part 28. The support device 18 serves for the mounting of the guide columns 22.

The support device 18 may have various forms. The support device 18 is preferably of frame-like design, preferably rectangular-frame-like design. The frame form is realized by a first cross-bracket 30, a second cross-bracket 32, a first connecting bracket 34 and a second connecting bracket 36. The connecting brackets 34, 36 connect the transverse brackets 30, 32 in each case at mutually opposite ends.

The cross-brackets 30, 32 are oriented substantially horizontally. The cross-brackets 30, 32 are spaced apart from one another with respect to a vertical direction. The cross-brackets 30, 32 run substantially parallel to one another. The first cross-bracket 30 is arranged above the second cross-bracket 32. The second cross-bracket 32 may be arranged further to the outside in relation to a transverse axis of the agricultural machine 10 than the first cross-bracket 30.

The cross-brackets 30, 32 are in the form of elongate bodies. The cross-brackets 30, 32 may be of plate-like design, as illustrated by way of example for the first cross-bracket 30 in FIG. 2. The cross-brackets 30, 32 may however also have two mutually opposite chords or ties 32A, 32B which are connected to one another only in certain sections, for example at the outer ends and in the centre, as illustrated by way of example for the second cross-bracket 32 in FIG. 2.

The steering column 20 is arranged between the cross-brackets 30, 32. The first cross-bracket 30 and the second cross-bracket 32 are each mounted rotatably with respect to the steering column 20. The steering column 20 is oriented upright, for example so as to be vertical or preferably inclined with respect to the vertical. The steering column 20 is arranged centrally between the connecting brackets 34, 36.

The support device 18 thus forms a double-shear connection to the steering column 20 or the pivot connection owing to the twofold rotational mounting of the steering column 20. A first shear surface exists in the region of the mounting of the steering column 20 in the first cross-bracket 30, specifically below the first cross-bracket 30 and above the steering column 20. A second shear surface exists in the region of the mounting of the steering column 20 in the second cross-bracket 32, specifically below the steering column 20 and above the second cross-bracket 32.

The steering column 20 is preferably framed by the support device 18. The support device 18 may, between the cross-brackets 30, 32 and the connecting brackets 34, 36, form a receptacle or a structural space for the arrangement of the steering column 20. The structural space may preferably have a height which corresponds to at least one third or one half of a total height of the support device 18. The structural space may have a width which corresponds to at least one third or one half of a total width of the support device 18. The structural space may for example be rectangular, preferably substantially square.

The connecting brackets 34, 36 are oriented upright, for example so as to be vertical or preferably inclined with respect to the vertical. The connecting brackets 34, 36 are spaced apart from one another with respect to a horizontal direction. The connecting brackets 34, 36 may be of symmetrical design in relation to one another with respect to a steering axis of the steering column 20. It may likewise be provided that the independent wheel suspension 12A has a substantially symmetrical construction in relation to the steering axis.

The connecting brackets 34, 36 are designed as elongate bodies, preferably tubular bodies. In each case one of the guide columns 22 is mounted in the connecting brackets 34, 36. In the case of the independent wheel suspension 12A, the guide columns 22 are mounted fixedly or immovably in the connecting brackets 34, 36. It is also possible for the guide columns 22 to be mounted displaceably in the connecting brackets 34, 36. The guide columns 22 may for example be mounted in a blind hole or passage hole of the connecting brackets 34, 36. The guide columns 22 may be secured in the connecting brackets 34, 36 in non-positively locking fashion (for example by means of a screw connection), positively locking fashion (for example by means of a tongue-and-groove connection) and/or cohesive fashion (for example by means of welding or adhesive bonding).

FIG. 4 shows a central longitudinal axis M of one of the guide columns 22 or of the connecting bracket 34. Also illustrated is a steering axis L of the steering column 20 or of the independent wheel suspension 12A. The guide columns 22, the connecting brackets 34, 36 and the steering column 20 may be oriented such that the central longitudinal axis M is parallel to the steering axis L. It is however also possible for the central longitudinal axis (plotted as M' in FIG. 4) to be skewed in relation to the steering axis L. The central longitudinal axis M' may preferably run so as to be more oblique/inclined in relation to the vertical than the steering axis L. An angle with respect to the vertical may, in the case of the central longitudinal axis M', be at most ±25° or at most ±15° or at most ±5° greater than an angle with respect to the vertical in the case of the steering axis L.

Owing to the different inclinations of the central longitudinal axis M' and of the steering axis L, it is possible for a spacing between the guide columns 22 and the wheel hub 24 at the level of the wheel hub 24 to be able to be reduced. The central longitudinal axis M or M' and the steering axis L may run in parallel planes which may be parallel to or inclined with respect to a transverse axis of the agricultural machine 10.

It is for example possible for only one connecting bracket and/or only one guide column to be included. For example, the one guide column may be mounted, for example fixedly or displaceably, in the one connecting bracket.

The support device 18 is preferably of integral, single-piece design. The cross-brackets 30, 32 and the connecting brackets 34, 36 may preferably be connected to one another integrally in one piece. For example, the cross-brackets 30, 32 and the connecting brackets 34, 36 may be formed as a common cast, forged, welded and/or fibre composite construction. As casting material, use may for example be made of aluminium, an aluminium alloy, a light metal, a light metal alloy, a cast iron, an iron alloy or a cast steel and/or a plastic.

The support device 18 preferably forms a single-piece housing for the mounting of the steering column 20 in the cross-brackets 30, 32 and the mounting of the guide columns 22 in the connecting brackets 34, 36.

The support device 18 may have further flange sections for the attachment of further components (for example steering cylinder, height adjustment device, spring device, damper device).

It is possible for the support device 18 to be reinforced in regions by means of a reinforcement insert (for example wear insert, threaded insert). Preferably, at least one reinforcement insert may be inlaid, cast in, screwed in or the like in the region of the mounting of the steering column 20 and/or of the guide columns 22 and/or in the region of flange sections for the attachment of further components (for example steering cylinder, height adjustment device, spring device, damper device).

It is also possible for a functional insert, which forms an anchoring and/or mounting element for fastening and/or guidance, to be arranged in the region of the mounting of the steering column 20 and/or of the guide columns 22. The functional insert may be inlaid, cast in, screwed in or the like. The functional insert may for example be a threaded sleeve or a mounting sleeve. The functional insert may be manufactured from a metallic material and/or from plastic.

Owing to the preferably integral embedding of the reinforcement insert and/or of the functional insert into the support device 18, no reinforcement inserts or functional inserts are separately shown, and separately denoted by a reference designation, in the figures.

The wheel hub 24 is mounted in, preferably slidingly, displaceable fashion on the guide columns 22. Specifically, a guide carriage 38 may serve for mounting the wheel hub 24 displaceably on the guide columns 22. The guide columns 22 guide the guide carriage 38 and the wheel hub 24 during the displacement. The guide carriage 38 may for example have passage holes. The guide columns 22 may extend through the passage holes. The guide carriage 38 may have guide bushings or plain bearing bushings in the passage holes. The passage holes of the guide carriage 38 may be aligned with the receptacles of the connecting brackets 34, 36 for the guide columns 22, as illustrated, or may be arranged offset in relation thereto (for example with respect to a transverse axis of the agricultural machine 10 and/or with respect to a longitudinal axis of the agricultural machine 10. It is thus also possible for the guide columns 22 to have a bend or the like (not illustrated).

The wheel hub 24 may have a wheel hub motor, for example an electrically or hydraulically operated wheel hub motor. The guide carriage 38 may for example be cast and have flange sections for the fastening of the wheel hub 24 and of the wheel hub motor.

In the case of the independent wheel suspension 12A, the wheel hub 24 (with its guide carriage 38) is connected by the spring device 26 to the support device 18. The guide carriage 38 has a flange surface for the fastening of the spring device 26. The spring device 26 is mounted preferably directly on a top side of the guide carriage 38.

The spring device 26 is arranged between the support device 18 and the guide carriage 38 or the wheel hub 24. The spring device 26 is arranged below the steering column 20 and the support device 18. The spring device 26 is arranged between the guide columns 22. The spring device 26 is oriented upright, for example so as to be vertical or preferably inclined with respect to the vertical.

In the case of the independent wheel suspension 12A, the spring device 26 is fastened to the support device 18 from below. The fastening is performed for example by means of a connecting element 40. The connecting element 40 may be arranged between a top side of the spring device 26 and a bottom side of the support device 18.

The spring device 26 connects the support device 18 and the wheel hub 24 with spring action. During the spring compression and spring extension movements of the spring device 26, the wheel hub 24 with the guide carriage 38 moves up and down along the guide columns 22.

The spring device 26 is designed preferably as a spring bellows, particularly preferably as an air spring bellows. To make a particularly small structural height possible, the spring bellows may for example be designed as a twin corrugated bellows (illustrated by way of example in FIGS. 7, 8 and 15 to 20).

It is possible for the spring device 26 to have not only a spring-mounting function for the independent wheel suspension 12A. Additionally, the spring device 26 may for example also allow a height adjustment of the independent wheel suspension 12A. To raise the independent wheel suspension 12A, the spring device 26 may be inflated with air. To lower the independent wheel suspension 12A, air may be discharged from the spring device 26.

A supply and discharge of compressed air with regard to the spring device 26 may be controlled by means of a control unit. The control unit can open, adjust or close corresponding valves in or upstream/downstream of the spring device 26. The spring device 26 can be charged with variably changeable pressures.

The spring device 26 may be equipped with a level valve. The level valve may be designed and/or actuated such that the spring device 26 seeks to maintain or move to the same position. The spring device 26 is, so to speak, always set to the same setting. As an alternative to a level valve, the use of "intelligent" valve technology would also be conceivable, for example with pressure detection sensors and a corresponding valve device.

The spring device 26 may preferably be designed and/or actuated so as to have a progressive spring force profile. The spring force is initially low at the outset during the spring compression or spring extension movement of the spring device 26. The spring force increases, for example in constant or exponential fashion, during the further spring compression or spring extension movement.

Figure 4A:
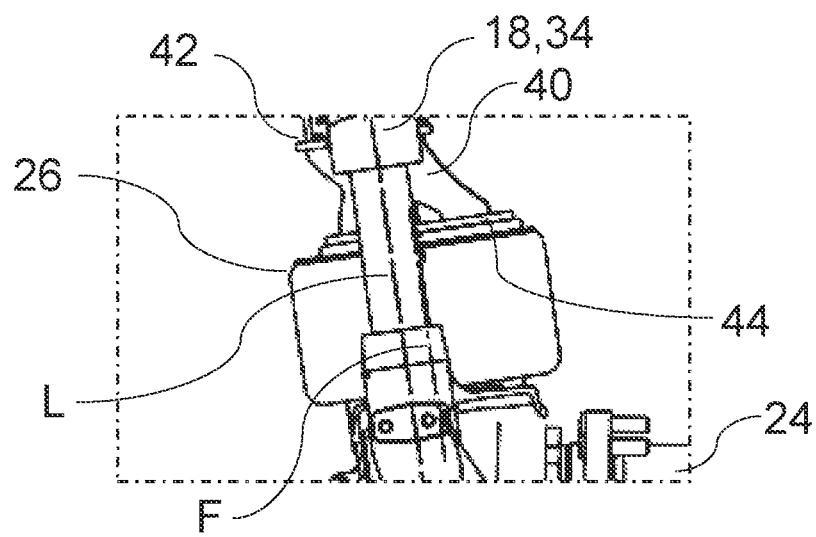

FIG. 4A illustrates a preferred arrangement of the spring device 26 in more detail. A central longitudinal axis F of the spring device 26 may, if desired, be non-coaxial with respect to the steering axis L. The central longitudinal axis F may for example be arranged parallel or at an angle with respect to the steering axis L. In the case of a parallel arrangement, a spacing between the steering axis L and the central longitudinal axis F may be between 0 cm and 2 cm, 4 cm or 10 cm. It is also possible for a spacing between a central point of the spring device 26 and the steering axis L to be greater than 0 cm and/or less than or equal to 2 cm, 4 cm or 10 cm. Preferably, the spring device 26 is arranged so as to be offset outwards with respect to the steering axis L in a transverse direction of the agricultural machine 10.

The offset arrangement of the spring device 26 as per FIG. 4A can be made possible by means of the connecting element 40. The connecting element 40 may be designed as a frame. The connecting element 40 may have a first flange surface 42 and a second flange surface 44. The flange surfaces 42, 44 may be arranged at opposite ends of the connecting element 40. The flange surfaces 42, 44 may be oppositely oriented and parallel with respect to one another. By means of the first flange surface 42, the connecting element 40 is fastened (for example in non-positively locking, positively locking and/or cohesive fashion) to the support device 18, preferably to a bottom side of the second cross-bracket 32. By means of the second flange surface 44, the connecting element 40 is fastened (for example in non-positively locking, positively locking and/or cohesive fashion) to the spring device 26, preferably to an upper side of the spring device 26. Whereas the first flange surface 42 is coaxial with respect to the steering axis L, the second flange surface 44 is coaxial with respect to the central longitudinal axis F. The flange surfaces 42, 44 may be connected to each other by means of (diagonal) struts.

Figure 5:
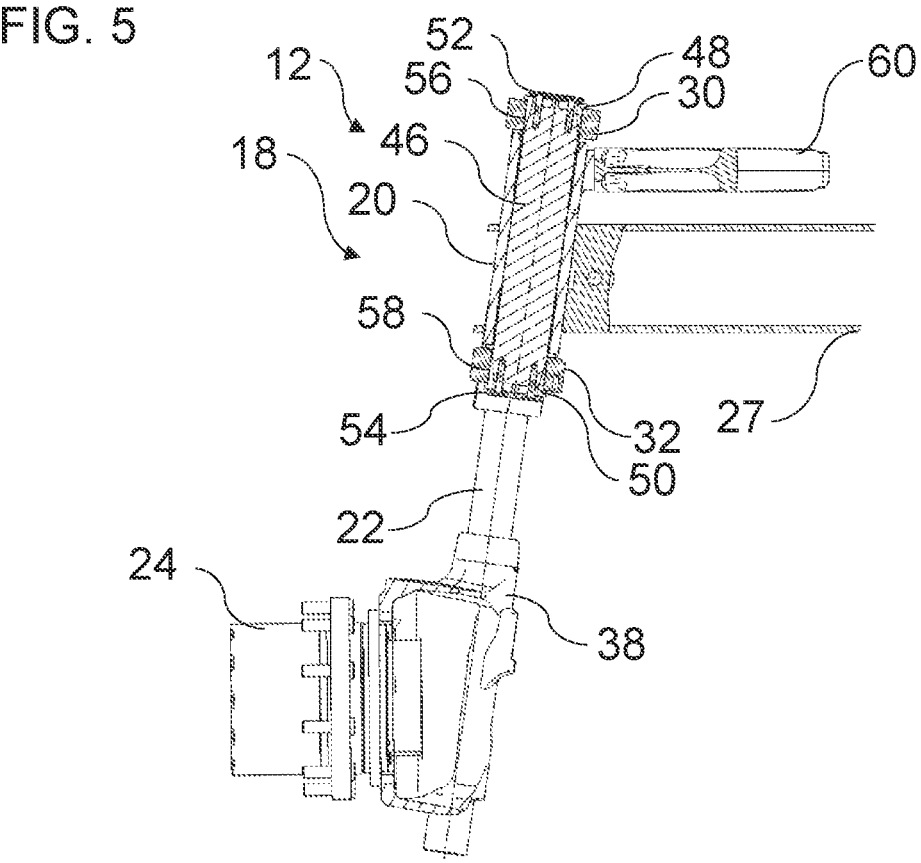
FIGS. 5 and 6 show sectional views through a steering column of an exemplary independent wheel suspension.
Figure 6:
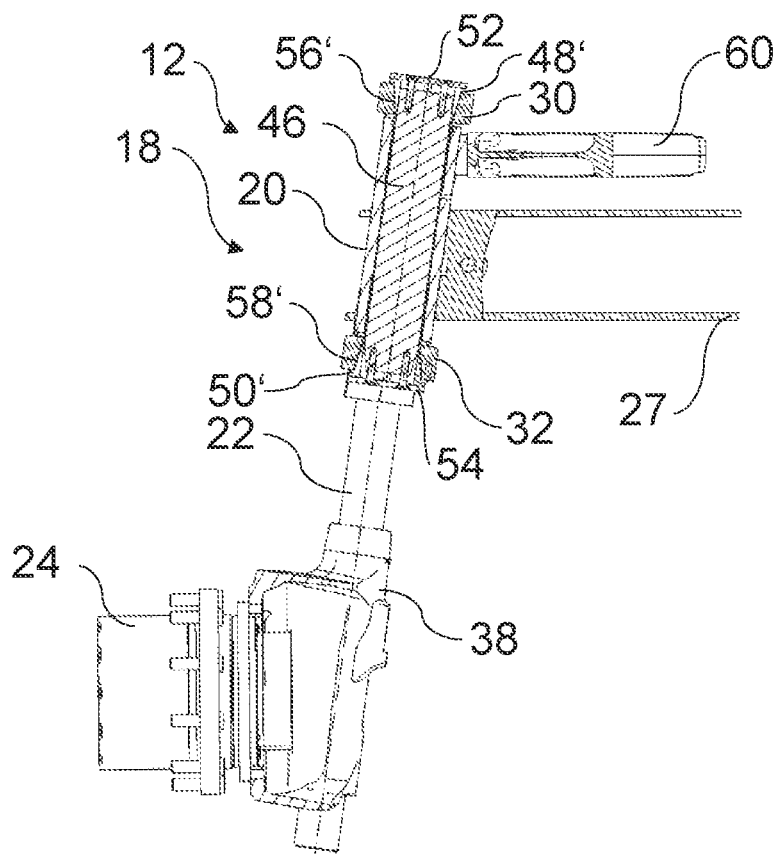

FIGS. 5 and 6 show preferred embodiments for the pivotable or rotational mounting of the steering column 20 in the cross-brackets 30, 32.

In the exemplary embodiment, the steering column 20 is pivotably connected to the cross-brackets 30, 32 by means of an inner bolt 46. The steering column 20 has a passage hole or has the form of a hollow cylinder. The inner bolt 46 is arranged in the passage hole in the steering column 20. The inner bolt 46 and steering column 20 are movable relative to one another. The inner bolt 46 can, for the steering of the independent wheel suspension 12, be rotated within the steering column 20. For example, an outer lateral surface of the inner bolt 46 and an inner lateral surface of the steering column 20 may slide against one another. It is also possible for a separate mounting bushing or a separate mounting, for example a plain bearing or a rolling body bearing, to be arranged between the inner bolt 46 and the steering column 20.

The inner bolt 46 serves for mounting the support device 18 pivotably/rotatably on the steering column 20. The inner bolt 46 is fastened to the cross-brackets 30, 32, preferably in holes of the cross-brackets 30, 32. It is preferably possible for opposite ends of the inner bolt 46 to protrude at opposite ends of the steering column 20. The protruding ends of the inner bolt 46 are fastened, preferably clamped, in the cross-brackets 30, 32. For the fastening of the protruding ends of the inner bolt 46 to the cross-brackets 30, 32, use may be made of a cone system, preferably a double cone system.

The two cross-brackets 30, 32 are thus mounted on the steering column 20 at two mounting points by means of the inner bolt 46. The two mounting points are vertically spaced apart from one another, such that the steering column 20 is oriented upright, for example so as to be vertical or preferably inclined with respect to the vertical. The guide columns 22 may be arranged, in certain sections, at the height of the two mounting points or of the two cross-brackets 30, 32.

FIG. 5 shows an example for a double cone system.

The inner bolt 46 is fastened by means of two clamping bushings 48, 50 and two clamping devices 52, 54 to the cross-brackets 30, 32.

The clamping bushings 48, 50 have a conical inner circumference or an internal cone. The ends of the inner bolt 46 each have an external cone. The internal cone of the first clamping bushing 48 lies against the external cone of a first end of the inner bolt 46. The first clamping bushing 48 protrudes beyond the first end of the inner bolt 46 in a direction away from the second clamping bushing 50. The internal cone of the second clamping bushing 50 lies against the external cone of a second end of the inner bolt 46. The second clamping bushing 50 protrudes beyond the second end of the inner bolt 46 in a direction away from the first clamping bushing 48.

The first clamping bushing 48 is received in a hole (for example passage hole) 56 of the first cross-bracket 30. The second clamping bushing 50 is received in a hole (for example passage hole) 58 of the second cross-bracket 32. The clamping bushings 48, 50 have, for example, cylindrical outer circumferences, and the holes 56, 58 are circular.

The clamping devices 52, 54 may each have a clamping plate and at least one clamping screw. Clamping plates are supported on the clamping bushings 48, 50. The clamping screws extend through the support plates. Heads of the clamping screws are supported on the clamping plates. The clamping screws can be screwed into the ends of the inner bolt 46. In this way, the clamping bushings 48, 50 are pushed further onto the inner bolt 46. The clamping bushings 48, 50 expand. An outer diameter of the clamping bushings 48, 50 increases. The inner bolt 46 is thus clamped in the holes 56, 58 by means of the clamping bushings 48.

It is possible, for example, for only one end of the inner bolt 46 to be clamped by means of a clamping bushing and a clamping device, and for the other end not to be (i.e. a single cone system). The other end could for example be fastened in some other way to the respective cross-bracket.

It is also possible for the cone system to be of some other design, as shown for example in FIG. 6.

By contrast to the exemplary embodiment of FIG. 5, the first clamping bushing 48' has a cylindrical inner circumference and a conical outer circumference or external cone. The hole 56' of the first cross-bracket 30 has an internal cone.

By contrast to the exemplary embodiment of FIG. 5, the second clamping bushing 50' has a conical outer circumference or external cone. The hole 58' of the second cross-bracket 32 has an internal cone.

It is self-evident that any combinations for the double cone systems of FIGS. 5 and 6 may be implemented. The first clamping bushing 48' could also be of the same design as the second clamping bushing 50' or the first clamping bushing 48. The second clamping bushing 50' could also be of the same design as the first clamping bushing 48' or the second clamping bushing 50.

The steering function of the independent wheel suspension 12 will be described in more detail below with reference to FIGS. 1 to 6.

For the steering of the support device 18 or of the independent wheel suspension 10, use may be made of a steering cylinder, for example a hydraulic cylinder, a pneumatic cylinder or some other linear drive. For the sake of clarity, the steering cylinder is not illustrated in the figures.

The steering cylinder may be attached by means of one end to a steering arm 60 and by means of an opposite end to the support device 18, preferably pivotably in each case. The steering arm 60 is fastened to the steering column 20 and/or to the frame part 28. The steering arm 60 may preferably engage around the steering column 20 at least in certain sections and/or be screwed directly to the steering column 20. The steering cylinder may be attached to a steering cylinder flange section 62 of the support device 18. Preferably, the steering cylinder flange section 62 is arranged on a top side of the support device 18, on a transition between the first cross-bracket 30 and one of the connecting brackets 34, 36, and/or on one of the connecting brackets 34, 36. The steering cylinder flange section 62 may be designed as a projection, as illustrated.

During the retraction and extension of the steering cylinder, the support device 18 is pivoted about the steering column 20, such that the independent wheel suspension 12 is steered.

The steering arm 60 may preferably be curved, for example in a direction away from the steering cylinder flange section 62. In this way, it is for example possible for more structural space to be provided for the steering cylinder in order to allow a sufficiently large steering angle.

It is preferably possible for yet further components to be fastenable to the support device 18. For example, a line guide 64 for guiding lines (for example fluid or electrical lines) along the support device 18 may be attached to the support device 18. The line may be held for example by means of a preferably hook-shaped clip element of the line guide 64.

Figure 7:
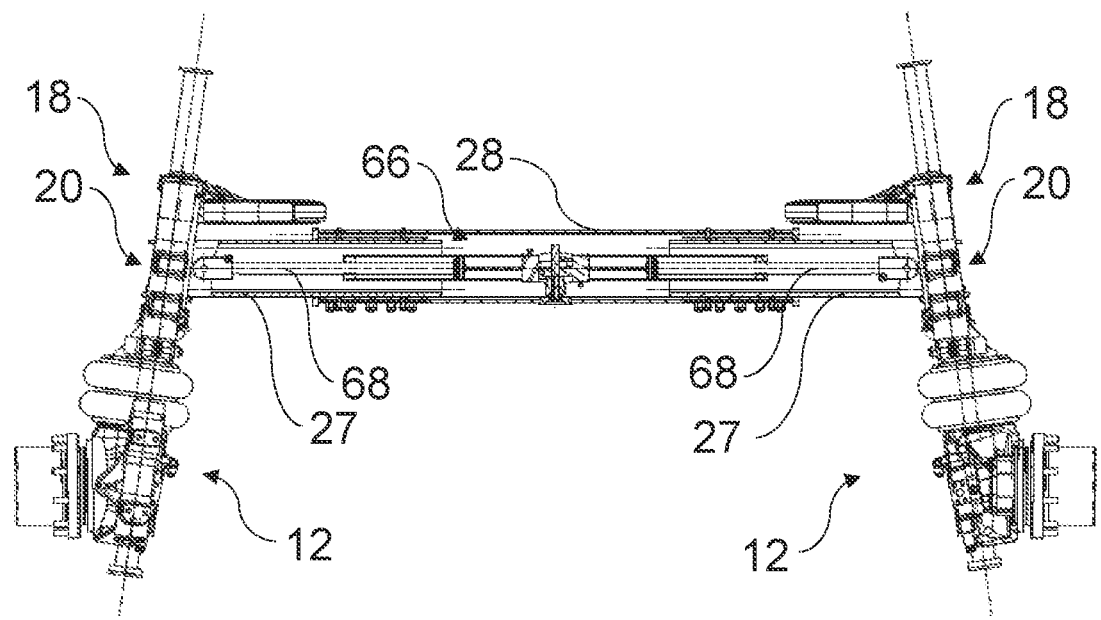
FIG. 7 shows a sectional view through an axle which is adjustable in terms of track width and which has two steerable independent wheel suspensions in an extended position.
Figure 8:
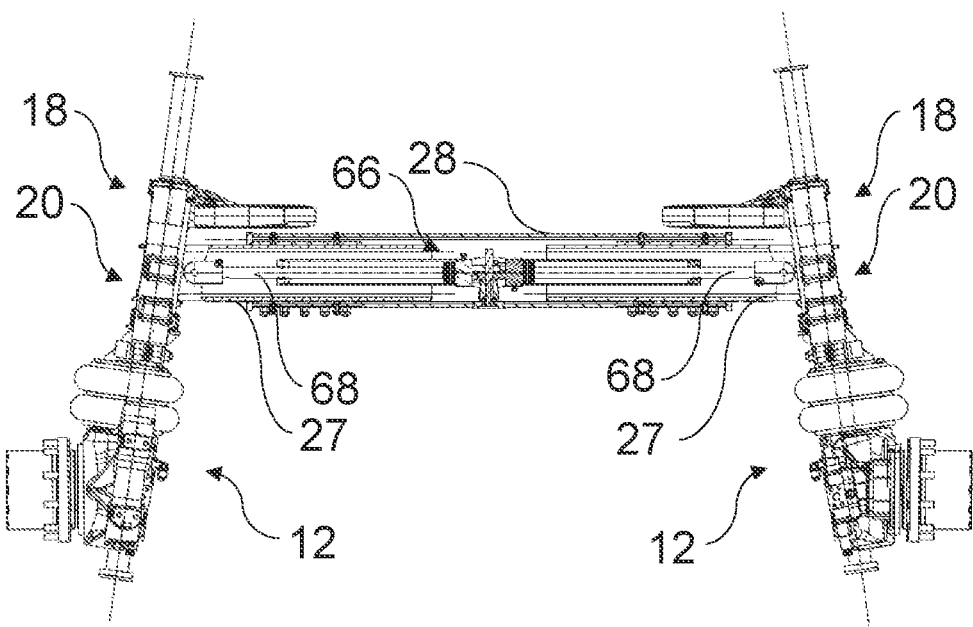
FIG. 8 shows a sectional view through the axle which is adjustable in terms of track width and which has two steerable independent wheel suspensions in a retracted position.

FIGS. 7 and 8 show that two independent wheel suspensions 12 of an axle 14 or 16 may be adjustable with respect to a transverse axis of the agricultural machine 10. It is thus possible for a track width of the agricultural machine 10 to be adapted.

The independent wheel suspensions 12 may be mounted on a track width setting device 66 so as to be displaceable with respect to a transverse axis of the agricultural machine 10. The track width setting device 66 is preferably fastened in each case to the steering column 20 of the independent wheel suspensions 12. During the retraction and extension of the track width setting device 66, the steering columns 20 are displaced, along with the support devices 18 connected pivotably to a respective steering column 20.

FIG. 7 illustrates the track width setting device 66 in the extended state for the purposes of setting a large track width. FIG. 8 illustrates the track width setting device 66 in the retracted state for the purposes of setting a small track width.

The track width setting device 66 may be received, preferably in protected fashion, and for example slidingly mounted in the frame part 28. The frame part 28 may for this purpose have a tubular form, for example with a cross section which is round, angular and/or flattened at least in certain sections. It is also possible for the track width setting device 66 to be fastened to the frame part 28, for example to the outside of the frame part 28.

The track width setting device 66 may have at least one linear drive 68 (for example pneumatic cylinder or hydraulic cylinder). The at least one linear drive 68 is oriented parallel to the transverse axis of the agricultural machine 10. For example, retractable and extendable pistons or piston rods of the linear drive 68 may be connected in terms of drive to the steering column 20 for the displacement of the steering column 20. The linear drive 68 is arranged for retracting and extending the displacement part 27, which is fastened to the steering column 20. The displacement part 27 is mounted displaceably in or on the frame part 28, in particular with respect to a transverse axis of the agricultural machine 10.

As already mentioned, it is however also possible for a track width of the agricultural machine 10 not to be adjustable. In this case, the steering columns 20 may be fastened to the frame part 28.

Figure 9:
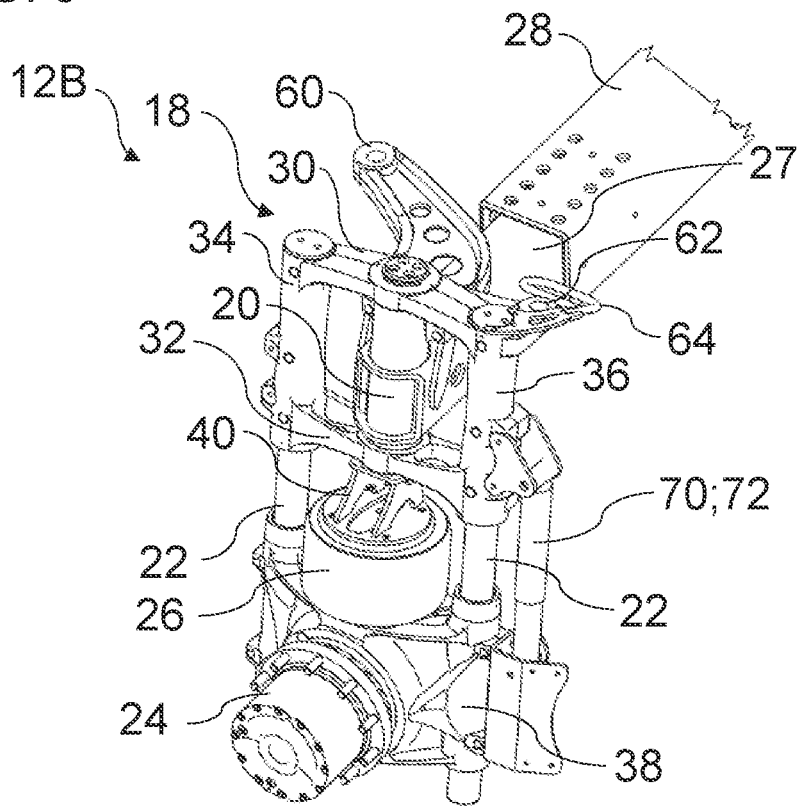
FIGS. 9-11 show various views of a second exemplary embodiment of a steerable independent wheel suspension according to the present disclosure.
Figure 10:
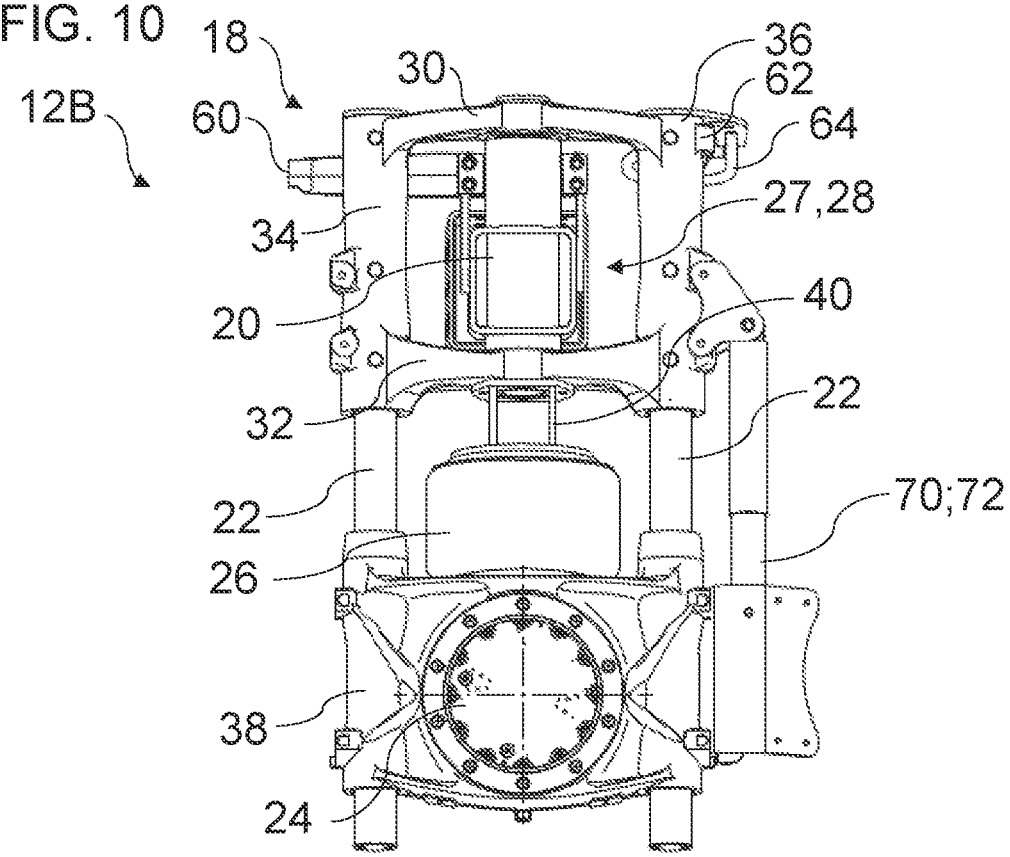
Figure 11:
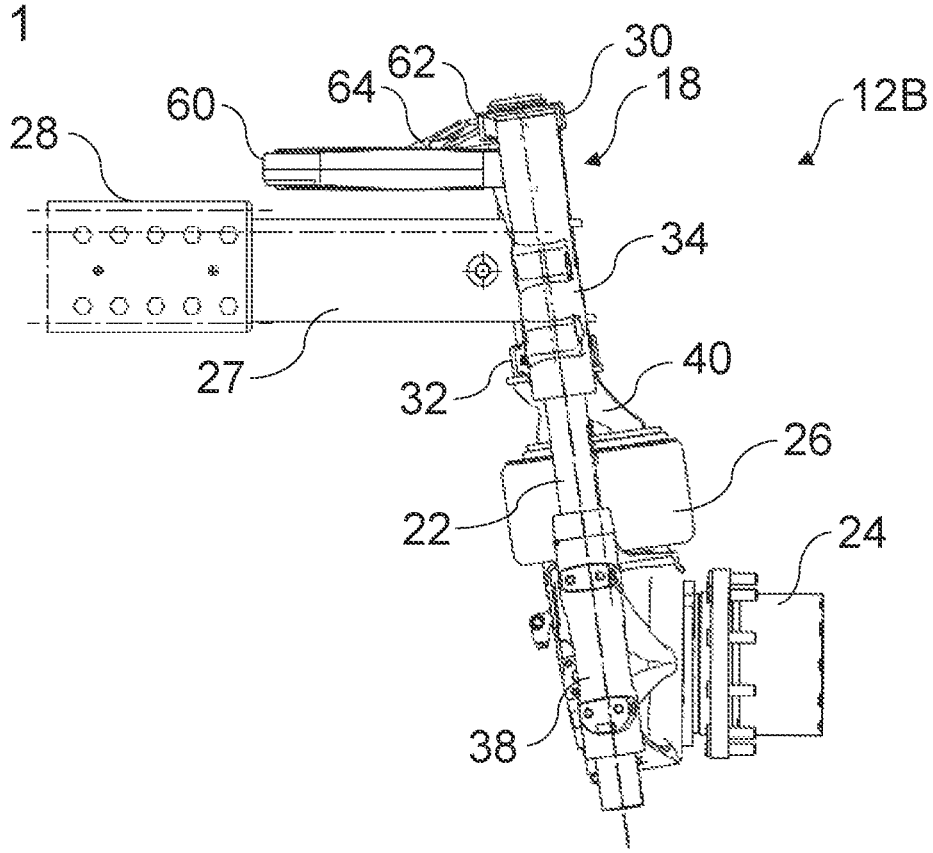

FIGS. 9 to 11 show a further exemplary embodiment for an independent wheel suspension 12B. The independent wheel suspension 12B of FIGS. 9 to 11 is similar to the independent wheel suspension 12A of FIGS. 2 to 4A.

A difference in relation to the independent wheel suspension 12A consists in that the independent wheel suspension 12B has a damper device 70.

The damper device 70 connects the wheel hub 24/the guide carriage 38 in damped fashion to the support device 18. The damper device 70 may be oriented parallel to the steering axis and/or to the at least one guide column 22. During the damping, the wheel hub 24 may move, guided on the at least one guide column 22, relative to the support device 18.

The damper device 70 is arranged on an outer side, which faces in a direction of travel (for example forward direction of travel or reverse direction of travel), of the independent wheel suspension 12B. A first end of the damper device 70 is fastened to the guide carriage 38, preferably to an outer side, which faces in a direction of travel (for example forward direction of travel or reverse direction of travel), of the guide carriage 38. An opposite, second end of the damper device 70 is fastened to the support device 18, preferably to an outer side, which faces in a direction of travel (for example forward direction of travel or reverse direction of travel), of the support device 18. It is also possible for the damper device 70 to be arranged not on an outer side, which faces in a direction of travel (for example forward direction of travel or reverse direction of travel), of the independent wheel suspension 12B but centrally on a front side or rear side of the independent wheel suspension 12B.

It is also possible for each independent wheel suspension 12B to include, for example, two damper devices 70, for example one damper device 70 on an outer side, which faces in a forward direction of travel, of the independent wheel suspension 12B and one damper device 70 on an outer side, which faces in a reverse direction of travel, of the independent wheel suspension 12B.

The damper device 70 may for example have a single-acting or double-acting pneumatic cylinder, a single-acting or double-acting hydraulic cylinder, a linear drive and/or a gas pressure damper or shock damper for damping oscillations. Depending on design, the damper device 70 may or may not require an actuation device (for example electric actuation device and/or fluidic actuation device).

It is possible for the damper device 70 to have not only a damping function for the independent wheel suspension 12B. Additionally, the damper device 70 may for example also allow a height adjustment of the independent wheel suspension 12B. In order to realize a shock-damping and height-adjustable connection by the damper device 70, it is for example possible for the damper device 70 to be designed as a fluid cylinder, preferably as a double-acting hydraulic cylinder and/or pneumatic cylinder. A first pressure chamber and a second pressure chamber of the damper device 70 may be fluidically connected by means of a connecting line. The connecting line may be assigned a control valve, for the preferably manual or automatic influencing of a volume flow. The control valve may expediently be a throttling check valve, a shut-off valve, a pressure control valve and/or a proportional valve. A simplified construction can be attained by virtue of the damper device 70 having a housing with a first pressure chamber and a second pressure chamber, and the connecting line and/or the control valve being integrated in the housing. In this way, there are no exposed connecting lines and/or valves on the damper device 70, only connectors for the fluid supply.

To raise the independent wheel suspension 12B, it is for example possible for a fluid to be fed to the damper device 70. To lower the independent wheel suspension 12B, the fluid can be discharged from the damper device 70.

The supply and discharge of fluid with respect to the damper device 70 can be controlled by means of a control unit. The control unit can open, adjust or close corresponding valves in or upstream/downstream of the damper device 70. The damper device 70 can be charged with variably changeable pressures.

It would for example also be possible for a height adjustment device 72 to be included instead of the damper device 70.

It is possible for the same type of stabilizer to be used for the damper device 70 and the spring device 26.

Figure 12:
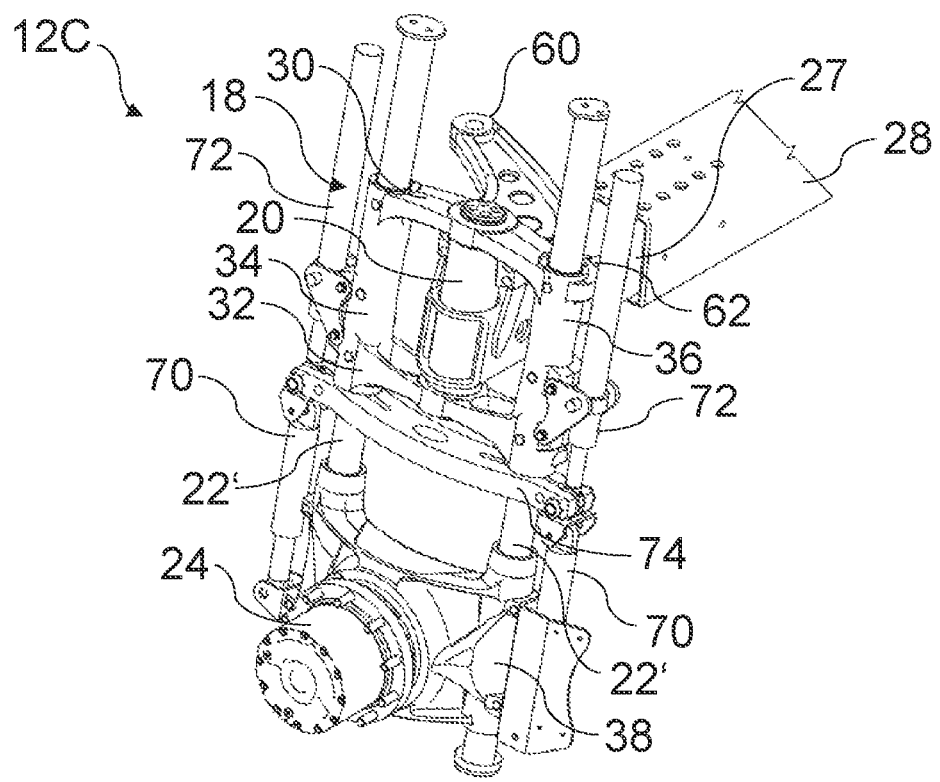
FIGS. 12-14 show various views of a third exemplary embodiment of a steerable independent wheel suspension according to the present disclosure.
Figure 13:
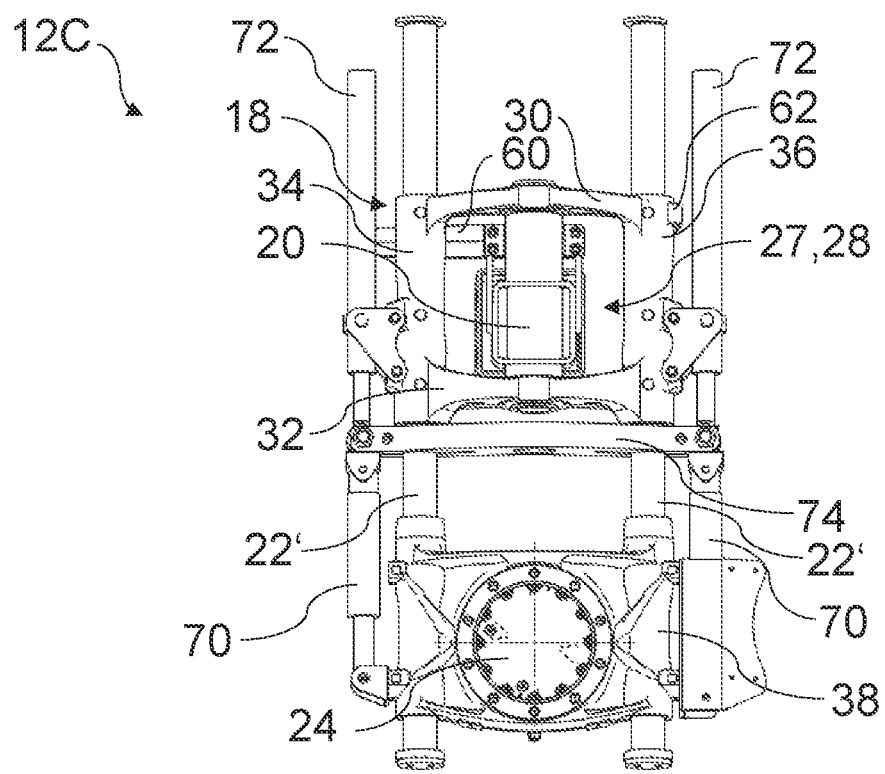
Figure 14:
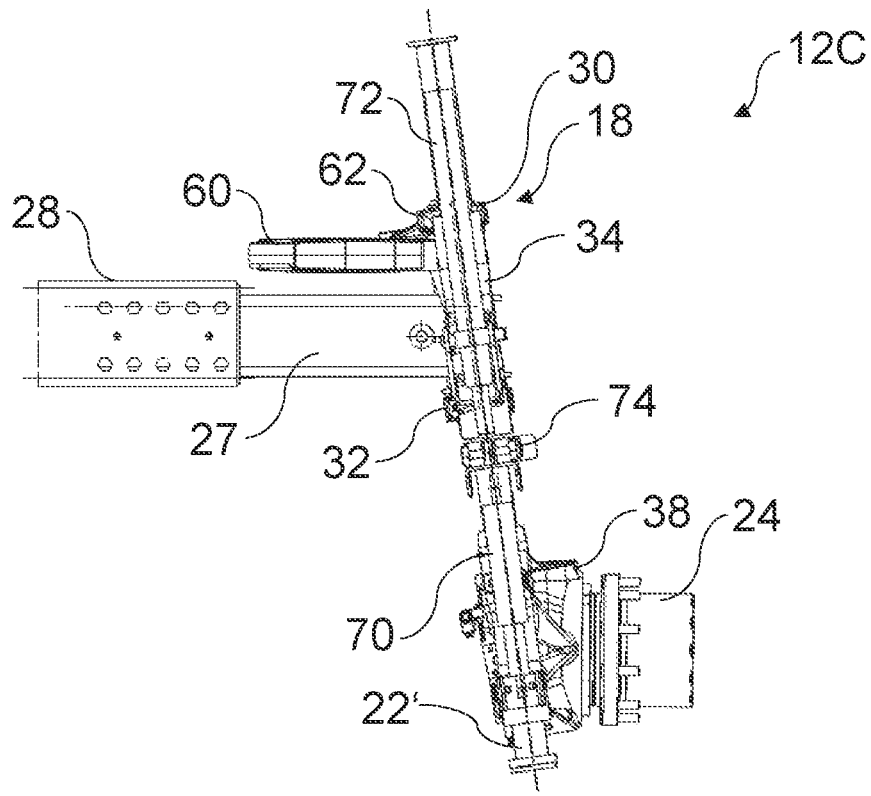

FIGS. 12 to 14 show a further exemplary embodiment for an independent wheel suspension 12C. The independent wheel suspension 12C of FIGS. 12 to 14 is similar to the independent wheel suspensions 12A (FIGS. 2 to 4A) and 12B (FIGS. 9 to 11).

Differences in relation to the independent wheel suspensions 12A and 12B consist in that the independent wheel suspension 12C has no spring device, two damper devices 70, two height adjustment devices 72, displaceable guide columns 22' and an additional bracket 74.

The guide columns 22' are mounted displaceably in the connecting brackets 34, 36. The displaceable mounting of the guide columns 22' allows height adjustability of the independent wheel suspension 12C. The guide columns 22' can —depending on height setting—protrude upwards and downwards beyond the support device 18, in particular the connecting brackets 34, 36. It is also possible, for example, for only one guide column 22' to be included.

The displaceable mounting of the guide columns 22' in the support device 18 may be implemented in a variety of ways. For example, a sliding connection may exist between an outer circumferential surface of the guide columns 22' and an inner circumferential surface of receptacles (for example passage holes) of the connecting brackets 34, 36. The cross sections of the guide columns 22' and of the receptacles may be correspondingly adapted to one another. It is also possible for separate mounting elements to be provided in the receptacles of the connecting brackets 34, 36 for the guide columns 22'. As mounting elements, use may for example be made of plain bearing bushings. It is preferable for in each case one (long) mounting element or in each case two mounting elements to be included per guide column 22', which mounting elements are arranged at opposite ends of the receptacle of the connecting brackets 34, 36.

It is preferable for a total length of the (plain) bearing surface per guide column 22' with respect to a longitudinal axis of the respective guide column 22' to be at least as large as a diameter of the respective guide column 22'. For example, if the guide column 22' has a diameter of 80 mm, then the bearing surface thereof in the connecting bracket 34 or 36 (for example smooth surface or at least one bearing bushing) has a length of at least 80 mm.

The height adjustment devices 72 allow a height adjustment of the wheel hub 24 relative to the support device 18. The height adjustment devices 72 are oriented parallel to the guide columns 22'.

The illustrated height adjustment device 72 has a (for example electromagnetic, electromotive, hydraulic or pneumatic) linear drive. Preferably, the height adjustment device 72 has at least one single-acting or double-acting fluid cylinder (for example hydraulic cylinder and/or pneumatic cylinder). The height adjustment device 72 may have at least one pressure chamber which, by means of a control unit, can be charged with variable pressure and/or with a variable volume of a fluid (volume flow control), preferably in each case one first pressure chamber and one second pressure chamber, which, by means of the control device, can be charged with variable pressure and/or with a variable volume of a fluid in each case independently of one another.

A first height adjustment device 72 is arranged on an outer side, which faces in a forward direction of travel, of the independent wheel suspension 12B. A second height adjustment device 72 is arranged on an outer side, which faces in a reverse direction of travel, of the independent wheel suspension 12B. It is also possible, for example, for only one height adjustment device 72 to be included per independent wheel suspension 12C.

The height adjustment device 72 is fastened to the support device 18, preferably to an outer side, which faces in a direction of travel (for example forward direction of travel or reverse direction of travel), of the support device 18. Furthermore, one end of the height adjustment device 72 is fastened to the bracket 74, preferably further to the outside than the guide columns 22'. The height adjustment devices 72 are preferably fastened at the outside to opposite ends of the bracket 74.

The height adjustment devices 72 connect the support device 18 in height-adjustable fashion to the bracket 74. During the adjustment of a height setting of the height adjustment devices 72, the bracket 74 is adjusted relative to the support device 18. The height adjustment devices 72 are arranged above the bracket 74.

The height adjustability can advantageously have the effect that a structural length of the independent wheel suspension 12C is not restricted, or is restricted only to a minor extent, by a length of the guide columns 22'. Guide columns which are not displaceable can have a shortened length, because they could otherwise collide with a wheel rim of the wheel when the independent wheel suspension cushions and/or dampens a movement. The height adjustability can furthermore have the advantage that the guide columns 22' can be oriented relatively obliquely with respect to the vertical. This can in turn significantly improve the moment compensation owing to the resulting relatively short lever lengths.

The bracket 74 is fixedly connected, for example in non-positively locking, positively locking and/or cohesive fashion, to the guide columns 22'. The guide columns 22' may in particular be clamped in a receptacle (for example passage hole) of the bracket 74, preferably at slotted ends of the bracket 74. The bracket 74 moves with the guide columns 22'. The bracket 74 may be fastened to the guide columns 22' or formed integrally in one piece with the guide columns 22', preferably as a cast, forged or welded construction.

The bracket 74 is formed separately from the support device 18. The bracket 74 is movable with the guide columns 22 relative to the support device 18. The bracket 74 is arranged below the support device 18 and above the wheel hub 24. The bracket 74 is oriented parallel to the cross-brackets 30, 32.

The wheel hub 24 is supported on the bracket 74, for example by the damper devices 70, as illustrated in FIGS. 12 to 14. The damper devices 70 are arranged below the bracket 74. The damper devices 70, on the one hand, and the height adjustment devices 72, on the other hand, are arranged on opposite sides of the bracket 74.

One end of the damper devices 70 is fastened to the bracket 74, preferably further to the outside than the guide columns 22'. The damper devices 70 are preferably fastened at the outside to opposite ends of the bracket 74.

It is for example also possible for the arrangement of the height adjustment devices 72 and of the damper devices 70 to be interchanged. The height adjustment devices 72 may be arranged below the bracket 74 and connect the bracket 74 in height-adjustable fashion to the wheel hub 24/the guide carriage 38. The damper devices 70 may be arranged above the bracket 74 and connect the bracket 74 in damped fashion to the support device 18.

The bracket 74 is thus movable relative to the support device 18 (for example for height adjustment by the height adjustment devices 72) and movable relative to the wheel hub 24 (for example for damping by the damper devices 70 and/or for spring-mounting (not illustrated in FIGS. 12 to 14)). The movements may be performed independently of one another. In other words, a spacing between the bracket 74 and the wheel hub 24 is variable, preferably for spring-mounting and/or damping of the wheel hub 24 on the bracket 74 or for height adjustment of the wheel hub 24 on the bracket 74. A spacing between the bracket 74 and the support device 18 is likewise variable, preferably for height adjustment of the steerable independent wheel suspension 12C or for spring-mounting and/or damping of the bracket 74 on the support device 18.

The arrangement of the bracket 74 thus makes it possible, for example, for a height adjustment of the independent wheel suspension by the height adjustment devices 72 to be able to be performed independently of a damping (and/or a spring-mounting) of the independent wheel suspension 12C. The height adjustment functionality, on the one hand, and the spring-mounting and/or damping, on the other hand, are preferably implemented on opposite sides of the bracket 74. By virtue of the fact that the spacing between the support device 18 and the bracket 74 and the spacing between the bracket 74 and the wheel hub 24 can vary independently of one another, the spring-mounting and/or damping always has the same characteristics independently of the height setting.

Figure 15:
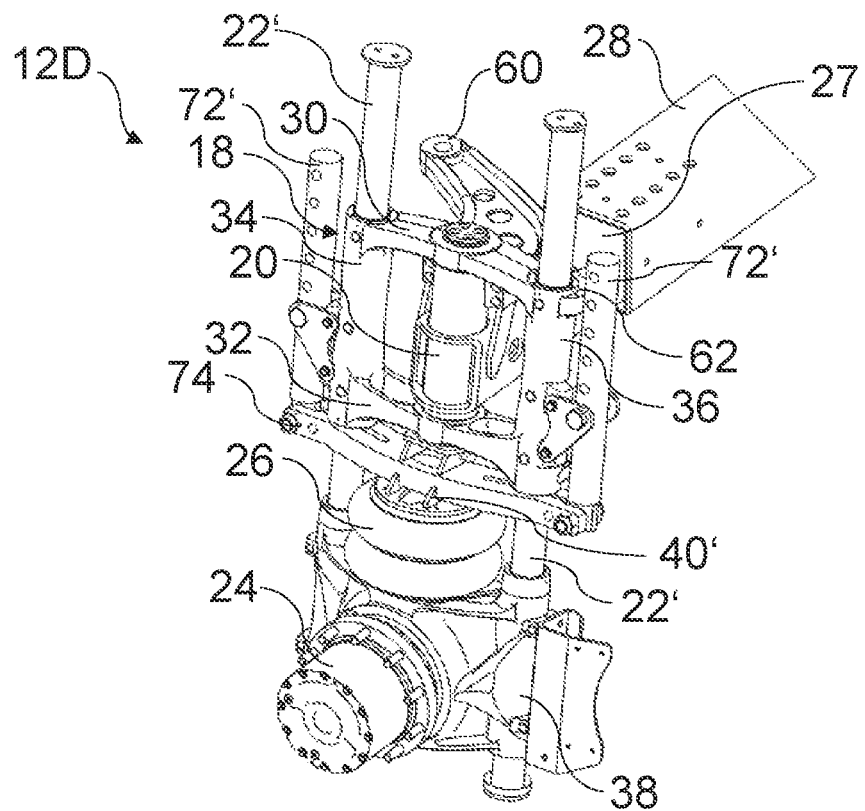
FIGS. 15-17 show various views of a fourth exemplary embodiment of a steerable independent wheel suspension according to the present disclosure.
Figure 16:
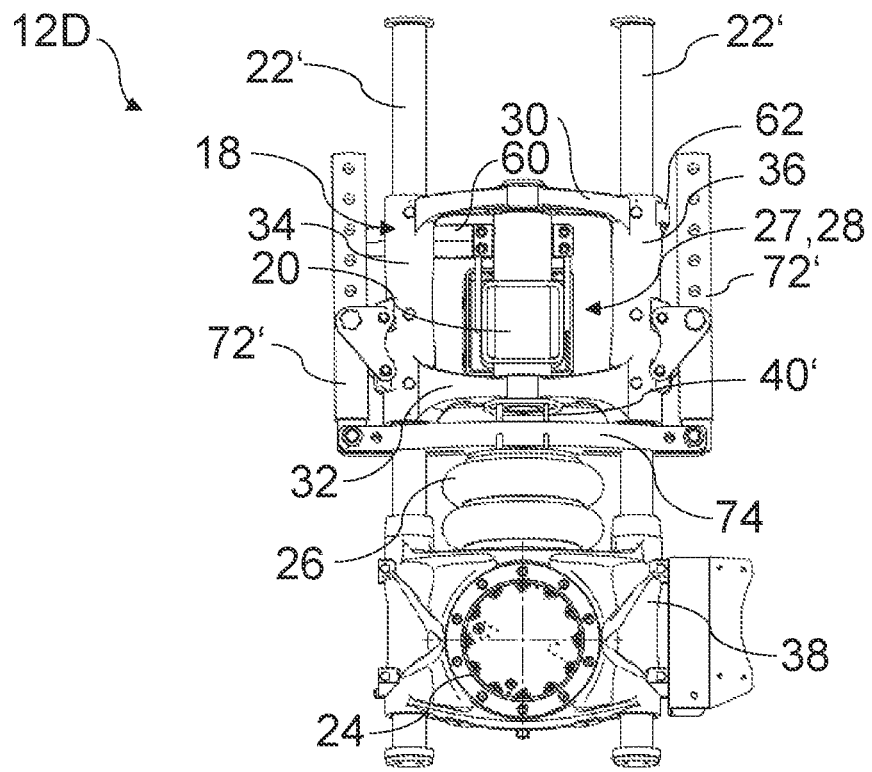
Figure 17:
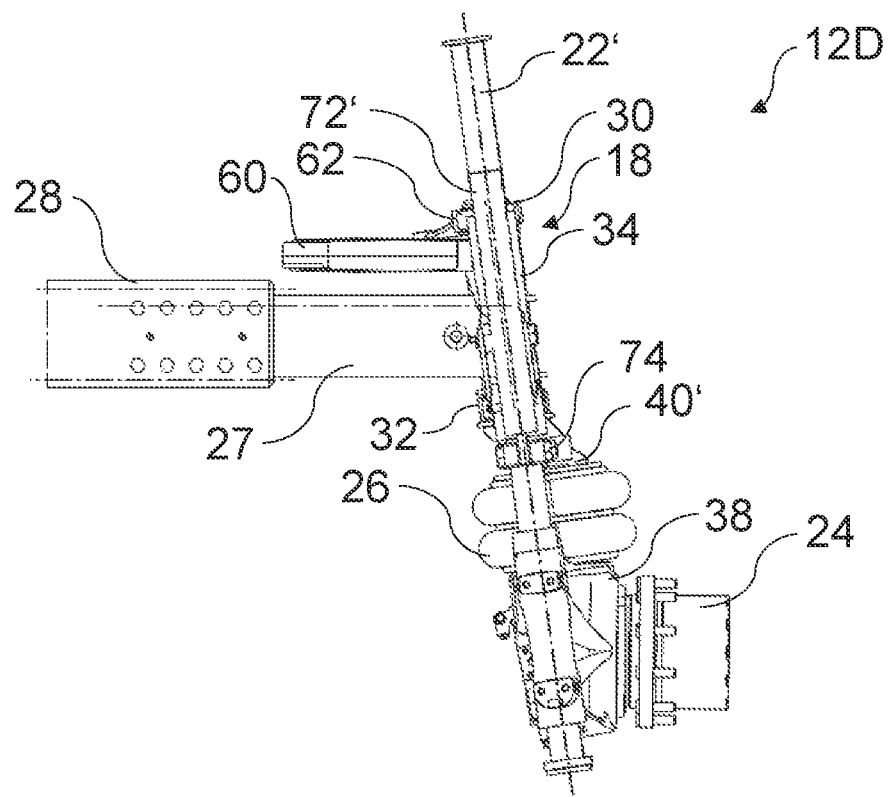

FIGS. 15 to 17 show a further exemplary embodiment for an independent wheel suspension 12D. The independent wheel suspension 12D of FIGS. 15 to 17 is similar to the independent wheel suspension 12C of FIGS. 12 to 14.

A difference in relation to the independent wheel suspension 12C consists in that the independent wheel suspension 12D has no damper devices 70 but has a spring device 26.

The spring device 26 is arranged below the bracket 74. The spring device 26 connects the wheel hub 24 with spring action to the bracket 74. The connecting element 40' fastens the spring device 26 to the bracket 74. By contrast to the connecting element 40 of the independent wheel suspensions 12A and 12B, the connecting element 40' of the independent wheel suspension 12D is not fastened to the support device 18. Otherwise, the spring device 26 of the independent wheel suspension 12D may for example be of the same arrangement and/or design as the spring device 26 of the independent wheel suspensions 12A and 12B.

It is also possible for the spring device 26 to be arranged above the bracket 74, between the bracket 74 and the support device 18. The spring device 26 can then connect the bracket 74 with spring action to the support device 18.

A further difference in relation to the independent wheel suspension 12C consists in that, in the case of the independent wheel suspension 12D, the height adjustment devices 72' are formed for example as mechanical locking device.

The height adjustment devices 72' may be designed as tubular bodies which may have receptacles/holes which are spaced apart from one another in a vertical direction. Depending on the desired height setting, the support device 18 can be manually fastened to a desired receptacle of the height adjustment devices 72', for example by means of screws, bolts, catches etc. Otherwise, the height adjustment devices 72' of the independent wheel suspension 12D may for example be of the same arrangement as the height adjustment devices 72 of the independent wheel suspension 12C.

Figure 18:
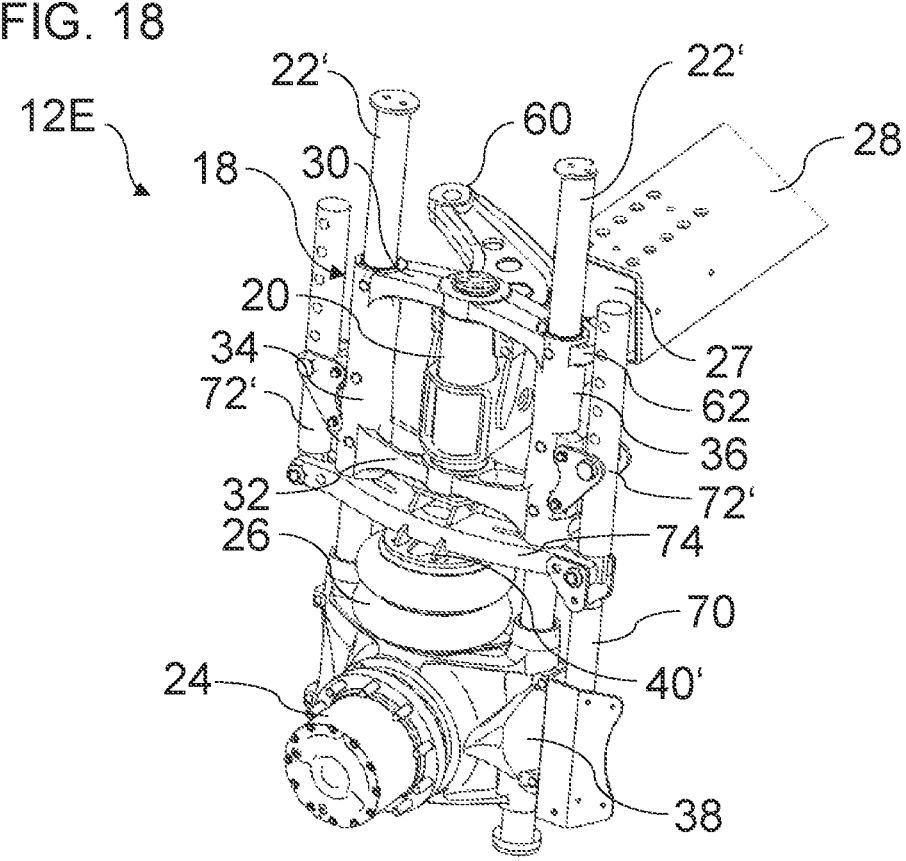
FIGS. 18-20 show various views of a fifth exemplary embodiment of a steerable independent wheel suspension according to the present disclosure.
Figure 19:
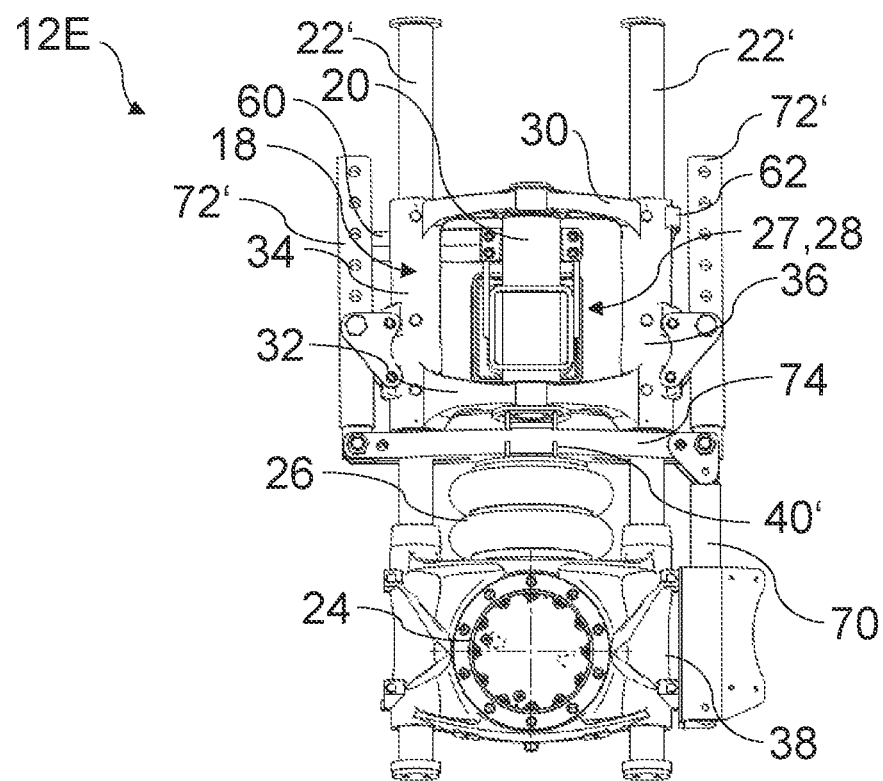
Figure 20:
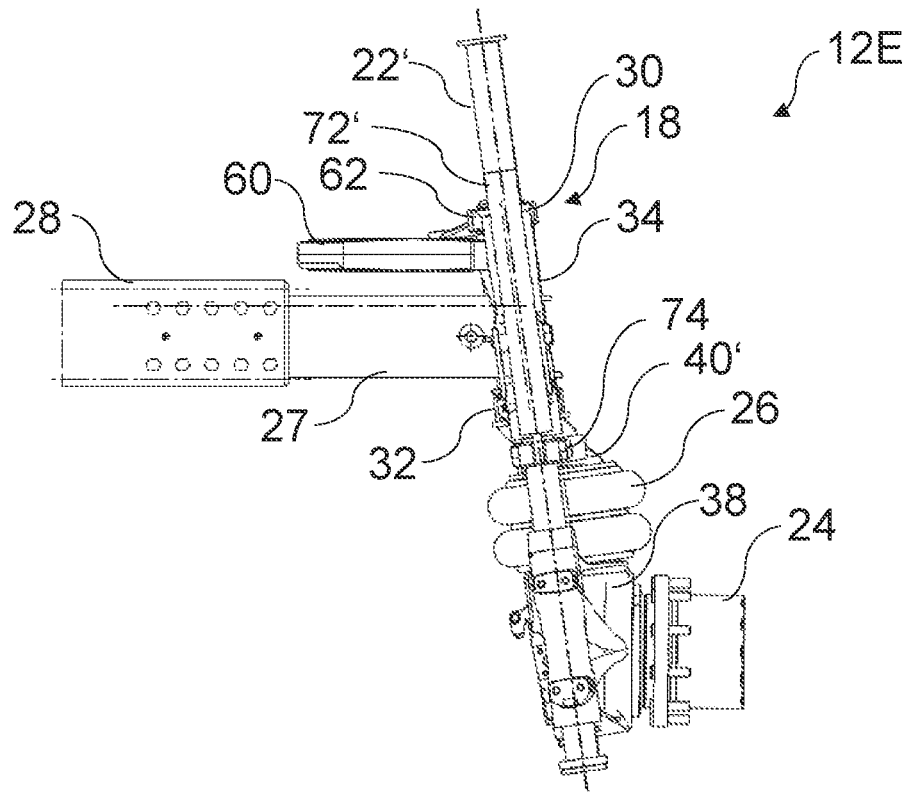

FIGS. 18 to 20 show a further exemplary embodiment for an independent wheel suspension 12E. The independent wheel suspension 12E of FIGS. 18 to 20 combines features of the independent wheel suspension 12C of FIGS. 12 to 14 with features of the independent wheel suspension 12D of FIGS. 15 to 17, wherein only one damper device 70 is included.

Figure 21:
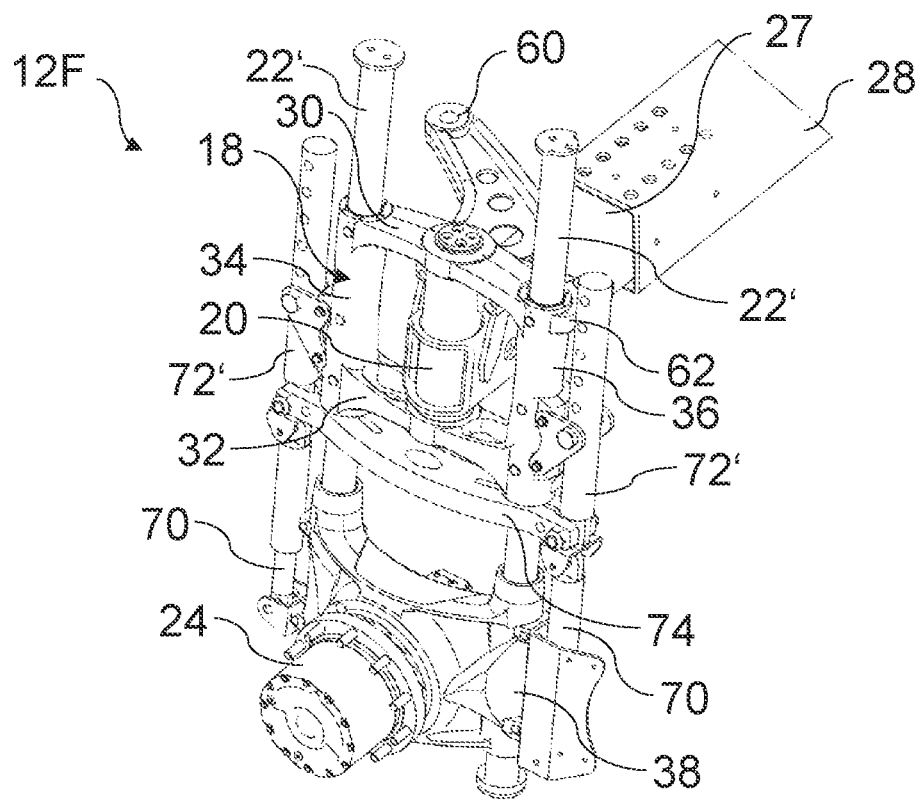
FIGS. 21-23 show various views of a sixth exemplary embodiment of a steerable independent wheel suspension according to the present disclosure.
Figure 22:
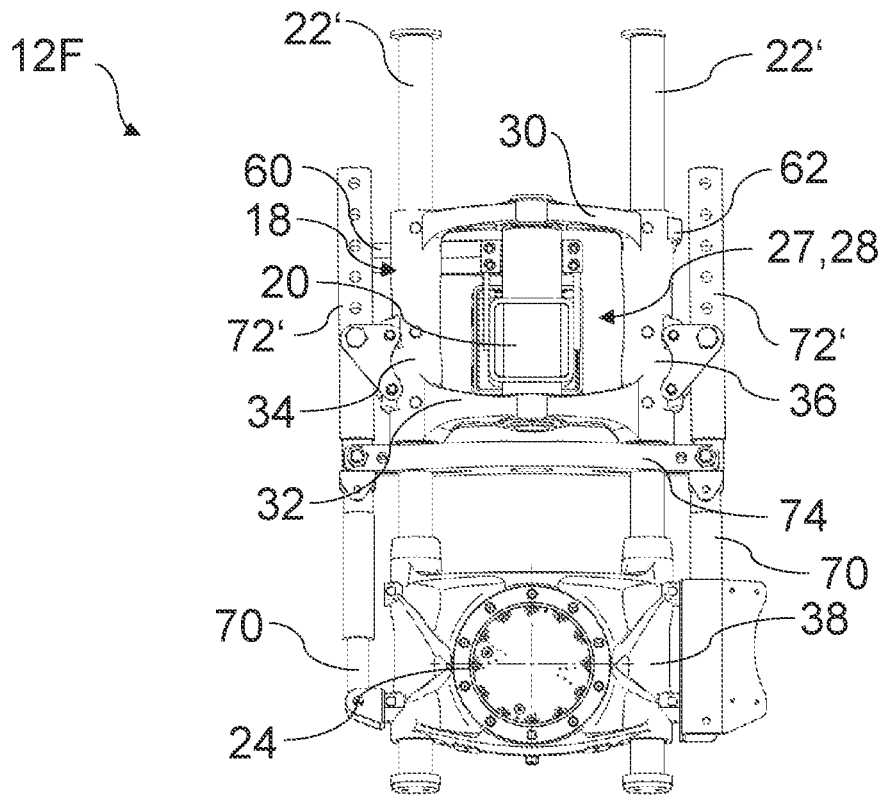
Figure 23:
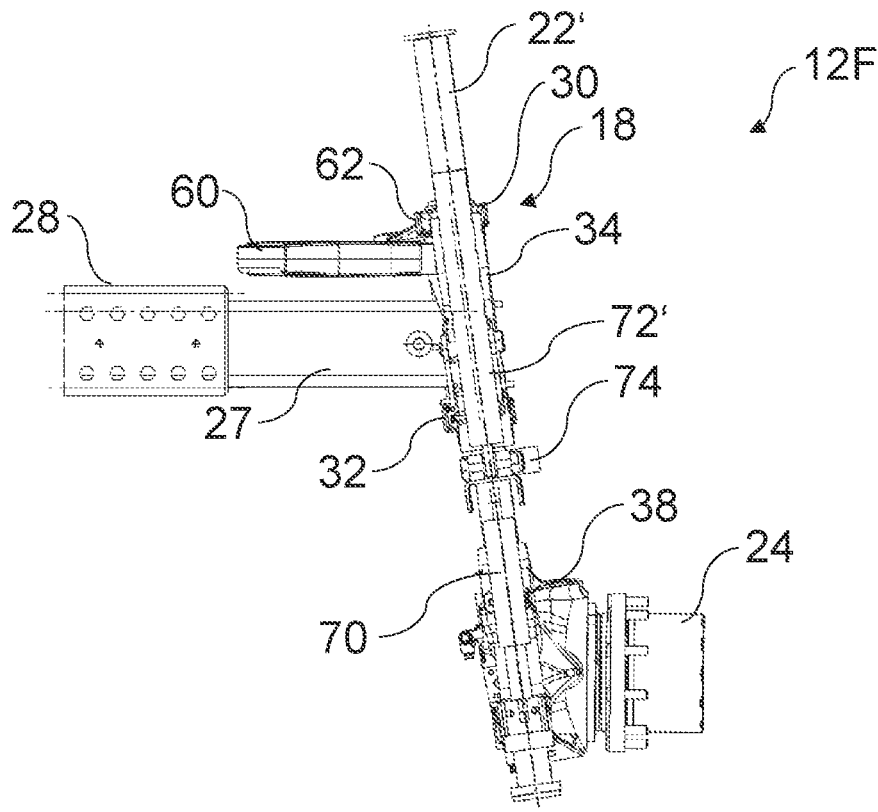

FIGS. 21 to 23 show a further exemplary embodiment for an independent wheel suspension 12F. The independent wheel suspension 12F of FIGS. 21 to 23 is similar to the independent wheel suspension 12C of FIGS. 12 to 14, wherein the height adjustment devices 72' are designed as mechanical locking device.

The invention is not restricted to the preferred exemplary embodiments described above. Rather, numerous variants and modifications are possible which likewise make use of the concept of the invention and which therefore fall within the scope of protection. In particular, the invention also claims protection for the subject matter and the features of the subclaims independently of the back-referenced claims. In particular, the individual features of independent claim 1 are disclosed in each case independently of one another. Additionally, the features of the subclaims are also disclosed independently of all of the features of independent claim 1. All ranges stated herein are to be understood as being disclosed such that, as it were, all values falling within the respective range are individually disclosed, for example also as respectively preferred narrower outer boundaries of the respective range.

| List of reference designations | |
|---|---|
| 10 | Mobile agricultural machine |
| 12(A-F) | Independent wheel suspension |
| 14 | Front axle |
| 16 | Rear axle |
| 18 | Support device |
| 20 | Steering column |
| 22 | Guide column |
| 24 | Wheel hub |
| 26 | Spring device |
| 27 | Displacement part |
| 28 | Frame part |
| 30 | First cross-bracket |
| 32 | Second cross-bracket |
| 32A-B | Chord/tie |
| 34 | First connecting bracket |

-continued

| List of reference designations | |
|---|---|
| 36 | Second connecting bracket |
| 38 | Guide carriage |
| 40 | Connecting element |
| 42 | First flange surface |
| 44 | Second flange surface |
| 46 | Inner bolt |
| 48 | First clamping bushing |
| 50 | Second clamping bushing |
| 52 | First clamping device |
| 54 | Second clamping device |
| 56 | Hole |
| 58 | Hole |
| 60 | Steering arm |
| 62 | Steering cylinder flange section |
| 64 | Line guide |
| 66 | Track width setting device |
| 68 | Linear drive |
| 70 | Damper device |
| 72 | Height adjustment device |
| 74 | Bracket |
| L | Steering axis |
| M | Guide column/connecting bracket central longitudinal axis |
| F | Spring device central longitudinal axis |

The invention claimed is:

1. A steerable independent wheel suspension for a mobile agricultural machine, having:
    a support device for the pivotable mounting of the independent wheel suspension on a frame part of the agricultural machine;
    at least one guide column which is mounted displaceably in the support device;
    a wheel hub which is guided displaceably along the at least one guide column;
    a bracket which is connected fixedly to the at least one guide column so as to move with the at least one guide column; and
    wherein the at least one guide column is clamped in a receptacle of the bracket, preferably at a slotted end of the bracket.

2. The steerable independent wheel suspension according to claim 1, wherein:
    the bracket is fastened to the at least one guide column; or
    the bracket is formed integrally in one piece with the at least one guide column, preferably as a cast, forged or welded construction.

3. The steerable independent wheel suspension according to claim 1, wherein:
    the bracket is arranged below the support device and/or above the wheel hub.

4. The steerable independent wheel suspension according to claim 1, wherein:
    the wheel hub is connected movably to the bracket; and/or
    the bracket is connected movably to the support device; and/or
    a spacing between the bracket and the wheel hub is variable, preferably for spring-mounting and/or damping of the wheel hub on the bracket; and/or
    a spacing between the bracket and the support device is variable, preferably for height adjustment of the steerable independent wheel suspension.

5. The steerable independent wheel suspension according to claim 1, wherein:
    a relative movement between the bracket and the wheel hub is independent of a relative movement between the bracket and the support device; and/or
    a variable spacing between the bracket and the wheel hub is independent of a variable spacing between the bracket and the support device.

6. A mobile agricultural machine having:
    at least one steerable independent wheel suspension according to claim 1.

7. A steerable independent wheel suspension for a mobile agricultural machine, having:
    a support device for the pivotable mounting of the independent wheel suspension on a frame part of the agricultural machine;
    at least one guide column which is mounted displaceably in the support device;
    a wheel hub which is guided displaceably along the at least one guide column;
    a bracket which is connected fixedly to the at least one guide column so as to move with the at least one guide column; and
    a spring device, preferably a spring bellows, which is fastened to the bracket.

8. The steerable independent wheel suspension according to claim 7, wherein:
    the spring device is arranged between the bracket and the wheel hub or is arranged between the bracket and the support device; and/or
    the spring device connects the wheel hub with spring action to the bracket or connects the bracket with spring action to the support device; and/or
    the spring device is arranged below or above the bracket.

9. A steerable independent wheel suspension for a mobile agricultural machine, having:
    a support device for the pivotable mounting of the independent wheel suspension on a frame part of the agricultural machine;
    at least one guide column which is mounted displaceably in the support device;
    a wheel hub which is guided displaceably along the at least one guide column;
    a bracket which is connected fixedly to the at least one guide column so as to move with the at least one guide column; and
    at least one damper device which is fastened to the bracket.

10. The steerable independent wheel suspension according to claim 9, wherein:
    the at least one damper device is arranged substantially parallel to the at least one guide column; and/or
    the at least one damper device connects the wheel hub with damping action to the bracket or connects the bracket with damping action to the support device; and/or
    the at least one damper device has a pneumatic cylinder, a hydraulic cylinder, a gas pressure damper or a shock damper; and/or
    the at least one damper device is arranged at the outside on a side, which faces in a direction of travel, of the steerable independent wheel suspension.

11. The steerable independent wheel suspension according to claim 9, wherein:
    it includes a single damper device which is fastened to one end of the bracket; or
    it includes two damper device which are fastened to opposite ends of the bracket.

12. A steerable independent wheel suspension for a mobile agricultural machine, having:

a support device for the pivotable mounting of the independent wheel suspension on a frame part of the agricultural machine;

at least one guide column which is mounted displaceably in the support device;

a wheel hub which is guided displaceably along the at least one guide column;

a bracket which is connected fixedly to the at least one guide column so as to move with the at least one guide column; and at least one height adjustment device which is fastened to the bracket.

13. The steerable independent wheel suspension according to claim 12, wherein:

the at least one height adjustment device is arranged substantially parallel to the at least one guide column; and/or the at least one height adjustment device connects the wheel hub in height-adjustable fashion to the bracket or connects the bracket in height-adjustable fashion to the support device; and/or the at least one height adjustment device has at least one linear drive, one pneumatic cylinder, one hydraulic cylinder or one mechanical height locking device; and/or the at least one height adjustment device is arranged at the outside on a side, which faces in a direction of travel, of the steerable independent wheel suspension.

14. The steerable independent wheel suspension according to claim 12, wherein:

the at least one height adjustment device and the at least one damper device are arranged on opposite sides in relation to the bracket.

* * * * *